United States Patent
Fujii

(10) Patent No.: US 10,574,846 B2
(45) Date of Patent: Feb. 25, 2020

(54) IMAGE SCANNER, METHOD, AND COMPUTER-READABLE MEDIUM FOR DETECTING DOCUMENT EDGE POSITIONS

(71) Applicant: BROTHER KOGYO KABUSHIKI KAISHA, Nagoya, Aichi (JP)

(72) Inventor: Isamu Fujii, Yokkaichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/161,131

(22) Filed: Oct. 16, 2018

(65) Prior Publication Data

US 2019/0124225 A1 Apr. 25, 2019

(30) Foreign Application Priority Data

Oct. 24, 2017 (JP) .................................. 2017-205216

(51) Int. Cl.
| | |
|---|---|
| H04N 1/04 | (2006.01) |
| H04N 1/00 | (2006.01) |
| G06T 7/13 | (2017.01) |
| G06T 7/73 | (2017.01) |
| G06T 7/44 | (2017.01) |

(52) U.S. Cl.
CPC .......... *H04N 1/00718* (2013.01); *G06T 7/13* (2017.01); *G06T 7/44* (2017.01); *G06T 7/74* (2017.01); *H04N 1/00702* (2013.01); *H04N 1/00748* (2013.01); *H04N 2201/04737* (2013.01)

(58) Field of Classification Search
CPC .......... H04N 1/00718; H04N 1/00702; H04N 1/00748; H04N 2201/04737; G06T 7/44; G06T 7/74; G06T 7/13

USPC .................. 358/1.15, 474, 498, 468
See application file for complete search history.

(56) References Cited

U.S. PATENT DOCUMENTS

| | | | | |
|---|---|---|---|---|
| 2003/0191100 | A1* | 10/2003 | Williams | A61K 31/00 514/177 |
| 2006/0221160 | A1* | 10/2006 | Ouchi | B41J 11/0025 347/101 |
| 2013/0074720 | A1* | 3/2013 | Yamauchi | B41J 29/38 101/485 |

FOREIGN PATENT DOCUMENTS

| | | |
|---|---|---|
| JP | H09-27909 A | 1/1997 |
| JP | 2002-142084 A | 5/2002 |

* cited by examiner

*Primary Examiner* — Gabriel I Garcia

(74) *Attorney, Agent, or Firm* — Scully Scott Murphy and Presser

(57) ABSTRACT

An image scanner includes a document detector configured to, each time line scanning is repeated a predetermined number of times, perform an edge detecting process to detect a position of a lateral side extending in a sub scanning direction from a non-reference corner of a sheet, in the edge detecting process performed for a first time, set a position of the non-reference corner in a main scanning direction as a detection reference position, in the edge detecting process performed for a second or later time, set a previously-detected position of the lateral side in the main scanning direction as the detection reference position, and in each edge detecting process, set a detection range in the main scanning direction on the basis of the detection reference position, and detect a specific pixel corresponding to the lateral side in the main scanning direction within the detection range in the main scanning direction.

13 Claims, 15 Drawing Sheets

IMAGE SCANNER, METHOD, AND COMPUTER-READABLE MEDIUM FOR DETECTING DOCUMENT EDGE POSITIONS

CROSS-REFERENCE TO RELATED APPLICATION

This application claims priority under 35 U.S.C. § 119 from Japanese Patent Application No. 2017-205216 filed on Oct. 24, 2017. The entire subject matter of the application is incorporated herein by reference.

BACKGROUND

Technical Field

Aspects of the present disclosure are related to an image scanner, a method, and a non-transitory computer-readable medium for detecting document edge positions.

Related Art

An image scanner has been known that is configured to extract an intended image representing a document sheet from an image scanned by a line image sensor. Specifically, the known image scanner may refer to a plurality of pixels of each line included in the scanned image in sequence from one end (e.g., a left end) to another (e.g., a right end) in a main scanning direction and detect pixel positions where a pixel color sharply changes from white to black or from black to white. Thereby, the image scanner may identify pixel positions corresponding to four sides of the sheet, and for instance, may detect a skew and a size of the sheet.

SUMMARY

However, when referring to the plurality of pixels of each line included in the scanned image in sequence from the left end in the main scanning direction, the known image scanner identifies, as a right edge of the sheet, a last one of the detected pixel positions where the pixel color sharply changes in each line. Hence, there is a potential risk that the image scanner might incorrectly detect a right edge of the sheet depending on a state of the sheet.

For instance, in an attempt to detect edges of an irregular sheet such as an index sheet with a tab or a sheet fastened with a clip, based on image data containing a scanned image of the tab or the clip, the image scanner might erroneously detect edges of the sheet due to influences of the tab or the clip.

Aspects of the present disclosure are advantageous to provide one or more improved techniques, for an image scanner, which make it possible to accurately detect positions of sides of a document sheet from a scanned image of the sheet even when the scanned image contains an image of an unnecessary portion such as a tab or a clip attached to the sheet.

According to aspects of the present disclosure, an image scanner is provided, which includes a document table configured to support a rectangular sheet placed thereon, the document table having a specific position thereon where one of four corners of the sheet is placed as a reference corner, an image sensor configured to repeatedly perform line scanning to scan the sheet placed on the document table in a main scanning direction while moving in a sub scanning direction perpendicular to the main scanning direction, thereby generating image data representing a scanned image of the sheet, and a document detector. The document detector is configured to detect a non-reference corner of the sheet placed on the document table, the non-reference corner being opposed to the reference corner across an upper side of the sheet in the main scanning direction, the upper side extending in the main scanning direction from the reference corner, each time the image sensor repeatedly performs the line scanning a predetermined number of times while moving in the sub scanning direction, perform an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times, in the edge detecting process performed for a first time, set a position of the detected non-reference corner in the main scanning direction as a detection reference position, in the edge detecting process performed for a second or later time, set a previous position of the lateral side in the main scanning direction as the detection reference position, the previous position being a detected position of the lateral side in a previous edge detecting process, and in each edge detecting process, set a first detection range in the main scanning direction on the basis of the set detection reference position, and detect a specific pixel corresponding to the lateral side in the main scanning direction within the first detection range in the main scanning direction.

According to aspects of the present disclosure, further provided is a method implementable on a processor coupled with an image scanner. The image scanner includes a document table configured to support a rectangular sheet placed thereon, the document table having a specific position thereon where one of four corners of the sheet is placed as a reference corner, and an image sensor configured to repeatedly perform line scanning to scan the sheet placed on the document table in a main scanning direction while moving in a sub scanning direction perpendicular to the main scanning direction, thereby generating image data representing a scanned image of the sheet. The method includes detecting a non-reference corner of the sheet placed on the document table, the non-reference corner being opposed to the reference corner across an upper side of the sheet in the main scanning direction, the upper side extending in the main scanning direction from the reference corner, each time the image sensor repeatedly performs the line scanning a predetermined number of times while moving in the sub scanning direction, performing an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times, in the edge detecting process performed for a first time, setting a position of the detected non-reference corner in the main scanning direction as a detection reference position, in the edge detecting process performed for a second or later time, setting a previous position of the lateral side in the main scanning direction as the detection reference position, the previous position being a detected position of the lateral side in a previous edge detecting process, and in each edge detecting process, setting a first detection range in the main scanning direction on the basis of the set detection reference position, and detecting a specific pixel corresponding to the lateral side in the main scanning direction within the first detection range in the main scanning direction.

According to aspects of the present disclosure, further provided is a non-transitory computer-readable medium storing computer-readable instructions that are executable by a processor coupled with an image scanner. The image scanner includes a document table configured to support a rectangular sheet placed thereon, the document table having a specific position thereon where one of four corners of the sheet is placed as a reference corner, and an image sensor configured to repeatedly perform line scanning to scan the sheet placed on the document table in a main scanning direction while moving in a sub scanning direction perpendicular to the main scanning direction, thereby generating image data representing a scanned image of the sheet. The instructions are configured to, when executed by the processor, cause the processor to detect a non-reference corner of the sheet placed on the document table, the non-reference corner being opposed to the reference corner across an upper side of the sheet in the main scanning direction, the upper side extending in the main scanning direction from the reference corner, each time the image sensor repeatedly performs the line scanning a predetermined number of times while moving in the sub scanning direction, perform an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times, in the edge detecting process performed for a first time, set a position of the detected non-reference corner in the main scanning direction as a detection reference position, in the edge detecting process performed for a second or later time, set a previous position of the lateral side in the main scanning direction as the detection reference position, the previous position being a detected position of the lateral side in a previous edge detecting process, and in each edge detecting process, set a first detection range in the main scanning direction on the basis of the set detection reference position, and detect a specific pixel corresponding to the lateral side in the main scanning direction within the first detection range in the main scanning direction.

BRIEF DESCRIPTION OF THE ACCOMPANYING DRAWINGS

FIG. 13A is an illustration for explaining how to sequentially set a next group of reference pixels on the basis of a specific black pixel included in a group of reference pixels currently referred to, when the sheet is not skewed, in the illustrative embodiment according to one or more aspects of the present disclosure.

FIG. 13B is an illustration for explaining how to sequentially set a next group of reference pixels on the basis of a specific black pixel included in a group of reference pixels currently referred to, when the sheet is skewed counterclockwise, in the illustrative embodiment according to one or more aspects of the present disclosure.

FIG. 13C is an illustration for explaining how to sequentially set a next group of reference pixels on the basis of a specific black pixel included in a group of reference pixels currently referred to, when the sheet is skewed clockwise, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
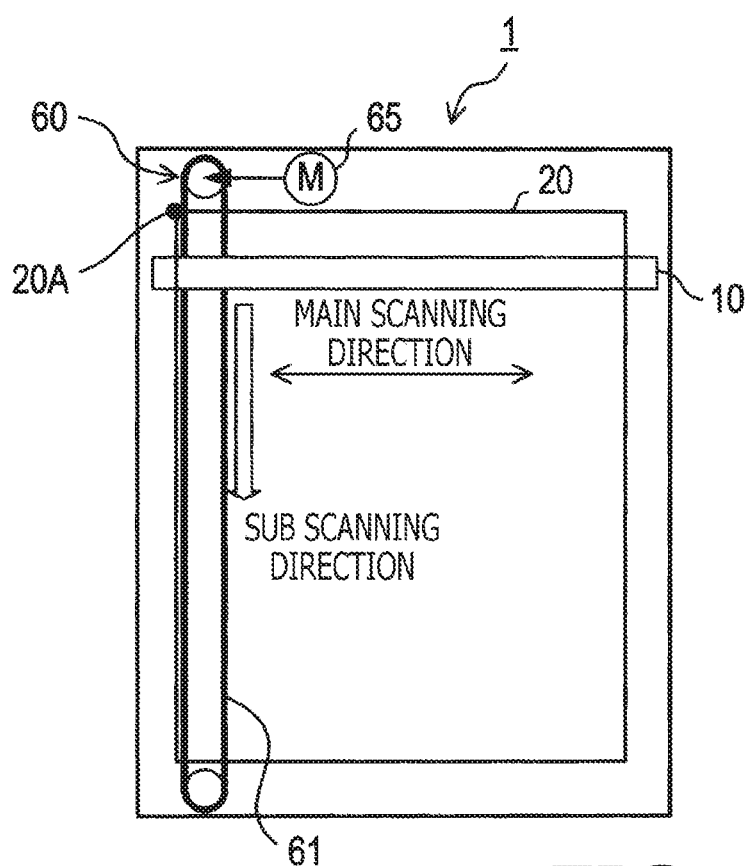
FIG. 1 is a partially transparent plan view showing a configuration of an image scanner in an illustrative embodiment according to one or more aspects of the present disclosure.

Hereinafter, an illustrative embodiment according to aspects of the present disclosure will be described with reference to the accompanying drawings. As shown in FIG. 1, an image scanner 1 of the illustrative embodiment is a flatbed type image scanner. The image scanner 1 includes a document table 20 and a line image sensor 10. The line image sensor 10, extending long in a main scanning direction, is configured to perform line scanning to linearly scan a sheet placed on the document table 20 in the main scanning direction. The image scanner 1 is configured to cause the line image sensor 10 to repeatedly perform the line scanning while moving the line image sensor 10 in a sub scanning direction perpendicular to the main scanning direction, thereby generating image data representing a scanned image of the sheet placed on the document table 20.

For instance, the generated image data may be transmitted to an external device such as a personal computer. When the image scanner 1 is included in a digital multi-function peripheral, the image data may be used for the multi-function peripheral to make a copy of the document sheet.

The document table 20 has a corner portion 20A for positioning the document sheet relative to the document table 20. For instance, a rectangular sheet Q having four corners may be placed in such a manner that a corner QA of the four corners is put in a correct position relative to the corner portion 20A (see FIG. 6).

The document table 20 includes a transparent platen glass. FIG. 1 is a plan view showing elements of the image scanner 1 that are positioned under the document table 20 and visible through the transparent platen glass. The line image sensor 10 is disposed to scan, through the platen glass from below, the sheet Q placed on an upper surface of the platen glass in the main scanning direction. More specifically, the line image sensor 10 is disposed movably along the sub scanning direction under the document table 20.

Figure 2:
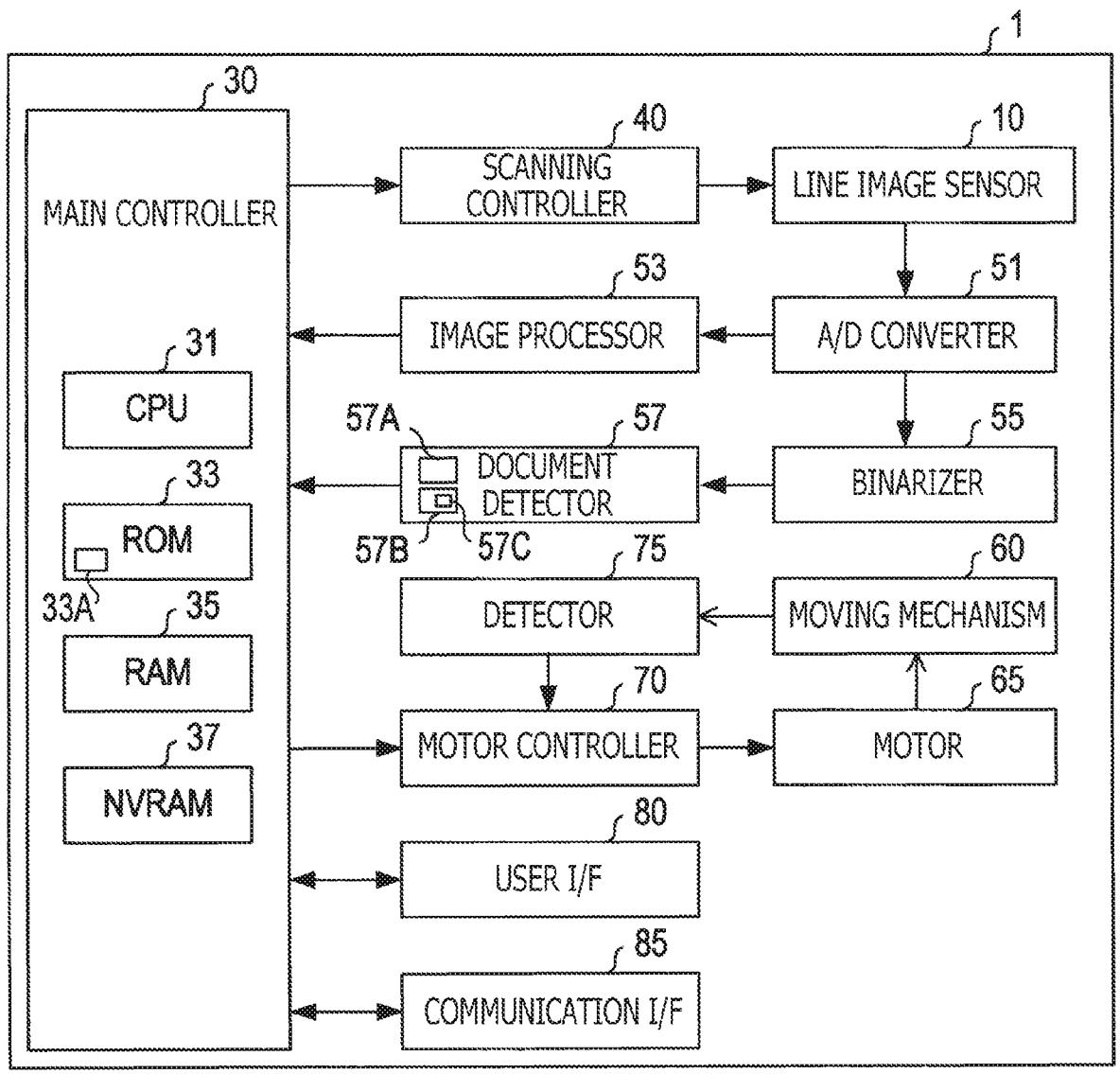
FIG. 2 is a block diagram showing an electrical configuration of the image scanner in the illustrative embodiment according to one or more aspects of the present disclosure.

As shown in FIG. 2, the image scanner 1 further includes a main controller 30, a scanning controller 40, an A/D converter 51, an image processor 53, a binarizer 55, a document detector 57, a moving mechanism 60, a motor 65, a motor controller 70, a detector 75, a user I/F ("I/F" is an abbreviation of "interface") 80, and a communication I/F 85.

The main controller 30 is configured to take overall control of the image scanner 1. The main controller 30 includes a CPU 31, a ROM 33, a RAM 35, and an NVRAM 37. The CPU 31 is configured to perform processes according to programs 33A stored in the ROM 33. The RAM 35 is usable as a work area when the CPU 31 performs processes. The NVRAM 37 includes a flash memory or an EEPROM. The image scanner 1 may implement various functions when the CPU 31 performs the processes according to the programs 33A stored in the ROM 33.

The scanning controller 40 is configured to control the line image sensor 10 in accordance with instructions from the main controller 30, thereby performing image scanning on a line-by-line basis. The line image sensor 10 is a contact image sensor (hereinafter referred to as a "CIS"). In each line scanning to linearly scan the sheet Q placed on the document table 20 in the main scanning direction, the line image sensor 10 emits light toward the sheet Q, receives reflected light from the sheet Q by a plurality of light receiving elements (not shown) arranged along the main scanning direction, and serially outputs, as analog signals, a group of pixel data each piece of which represents a quantity of light received by a corresponding one of the light receiving elements. Namely, the group of pixel data serially output in each line scanning corresponds to image data representing a scanned image of one line.

Thus, the line image sensor 10 optically scans the sheet Q placed on the document table 20 on a line-by-line basis while moving in the sub scanning direction, thereby generating image data representing a scanned image of the sheet Q. The image data generated in each line scanning is converted into digital signals through the A/D converter 51 and then transmitted to the image processor 53 and the binarizer 55.

The image processor 53 is configured to perform image processing (e.g., gamma correction) for the digital image data output from the A/D converter 51 and then transmit the processed image data to the main controller 30. Thereby, the image data representing a scanned image of each single line is sequentially stored and accumulated into the RAM 35 of the main controller 30 in response to the line scanning being repeatedly performed from one line to another. Finally, image data representing a whole scanned image of the sheet Q is generated. For instance, the generated image data may be color image data.

The binarizer 55 is configured to binarize the image data received from the A/D converter 51 and transmit the binarized image data to the document detector 57. The binarized image data represents a value of each pixel with "0" for black or "1" for white. The binarization may be performed with differential processing.

The document detector 57 is configured to, based on the binarized image data, detect positions of an upper side, a left side, a right side, and a lower side of the sheet Q in the scanned image represented by the image data, and then transmit the detection results to the main controller 30. The upper side is an upstream side of the sheet Q in the sub scanning direction and extends along the main scanning direction. Further, the upper side has the corner QA as a left end thereof. As described above, the corner QA is a reference corner QA to be placed in a correct position relative to the corner portion 20A of the document table 20. The right side extends along the sub scanning direction from a non-reference corner QB that is opposed to the reference corner QA across the upper side in the main scanning direction.

For instance, the document detector 57 may include one or more specific circuits (not shown), and may be configured to perform necessary processes by the one or more specific circuits. In another exemplary configuration, the document detector 57 may include a general-purpose processor 57A and a memory 57B storing programs 57C (see FIG. 2) configured to, when executed by the processor 57A, cause the processor 57A to perform the necessary processes. The necessary processes include a below-mentioned document detecting process (see FIG. 4). The memory 57B may include at least one of a RAM, a ROM, and an NVRAM.

Based on the detection results received from the document detector 57, the main controller 30 specifies a document area in the scanned image represented by the image data received from the image processor 53. Further, the main controller 30 performs a trimming process to extract data of the specified document area from the image data.

The moving mechanism 60 is configured to move the line image sensor 10 along the sub scanning direction. The moving mechanism 60 is driven by the motor 65. The moving mechanism 60 exemplified in FIG. 1 includes an endless belt 61. The line image sensor 10 is attached to the endless belt 61. In response to receiving a driving force from the motor 65, the endless belt 61 revolves thereby moving the line image sensor 10 in the sub scanning direction. Thus, the line image sensor 10 moves in the sub scanning direction in accordance with the revolution of the endless belt 61 while being supported by guides (not shown).

According to instructions from the main controller 30, the motor controller 70 performs feedback control of the rotation of the motor 65 based on information (including a rotational position and a rotational speed) received from the detector 75. Thereby, the motor controller 70 controls movement of the line image sensor 10 via the moving mechanism 60. For instance, the detector 75 may include an encoder (not shown) attached to a rotational shaft of the motor 65 and a signal processing circuit (not shown) for converting output signals from the encoder into the rotational position and the rotational speed.

The user I/F 80 is configured to accept user operations and display information directed to the user. For instance, the user I/F 80 may include an LCD and a touch panel on the LCD. A signal, issued in response to a user operation accepted via the user I/F 80, is transmitted to the main controller 30. For instance, the user I/F 80 may display thereon various kinds of information for the user, under control by the main controller 30.

The communication I/F 85 is configured to communicate with external devices. For instance, the communication I/F 85 may convey instructions from an external device to the main controller 30. Further, the communication I/F 85 may transmit the image data representing the scanned image of the sheet Q from the main controller 30 to an external device. Specific examples of the communication I/F 85 may include a LAN I/F and a USB I/F.

Figure 3:
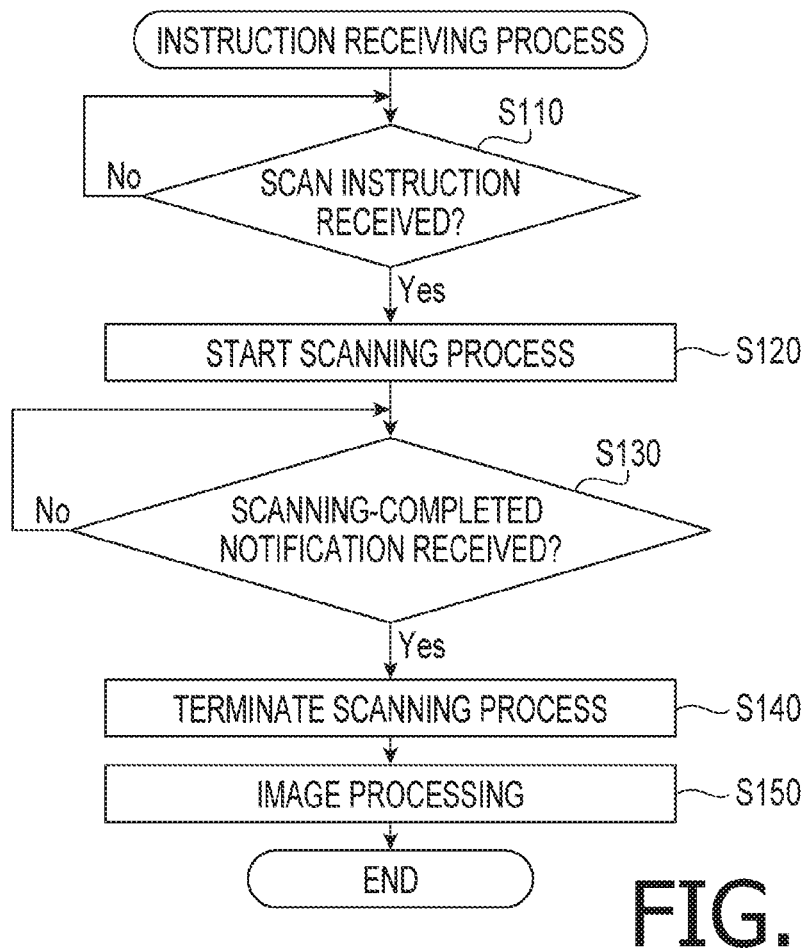
FIG. 3 is a flowchart showing a procedure of an instruction receiving process to be performed by a main controller of the image scanner in the illustrative embodiment according to one or more aspects of the present disclosure.

In response to receiving an instruction from an external device or via the user I/F 80, the main controller 30 performs a process corresponding to the instruction. Specifically, the main controller 30 repeatedly performs an instruction receiving process (see FIG. 3) and waits until a scan instruction is input by the user via the external device or the user I/F 80 (S110). Then, in response to a scan instruction being input, the main controller 30 starts a scanning process to scan the image of the sheet Q (S120).

In the scanning process, the main controller 30 instructs the motor controller 70 to control the motor 65 so as to move the line image sensor 10 in the sub scanning direction at a constant speed corresponding to a scanning resolution. Further, the main controller 30 instructs the scanning controller 40 to control the line image sensor 10 to perform the line scanning at regular intervals of a constant period of time corresponding to the scanning resolution.

Further, the main controller 30 activates the image processor 53 and the document detector 57, sequentially stores and accumulates image data received from the image processor 53 into the RAM 35, and receives, from the document detector 57, the detection results (including information on a position and a skew of the sheet Q) regarding the sheet Q.

Afterward, in response to receiving from the document detector 57 a notification (hereinafter, which may be referred to as a "scanning-completed notification") that image scanning from a leading end (i.e., an upstream end) to a trailing end (i.e., a downstream end) of the sheet Q in the sub scanning direction has been completed (S130: Yes), the main controller 30 terminates the scanning process (S140). At a time when the scanning process is terminated, the main controller 30 transmits a stop instruction to the scanning controller 40 and the motor controller 70, thereby causing the line image sensor 10 to stop repeatedly performing the line scanning, and causing the moving mechanism 60 to stop moving the line image sensor 10.

Afterward, the main controller 30 performs image processing such as a trimming process, for the image data representing the whole scanned image stored and accumulated in the RAM 35 (S150). Then, the main controller 30 terminates the instruction receiving process shown in FIG. 3. In the trimming process, the main controller 30 extracts the document area from the image data.

Figure 4:
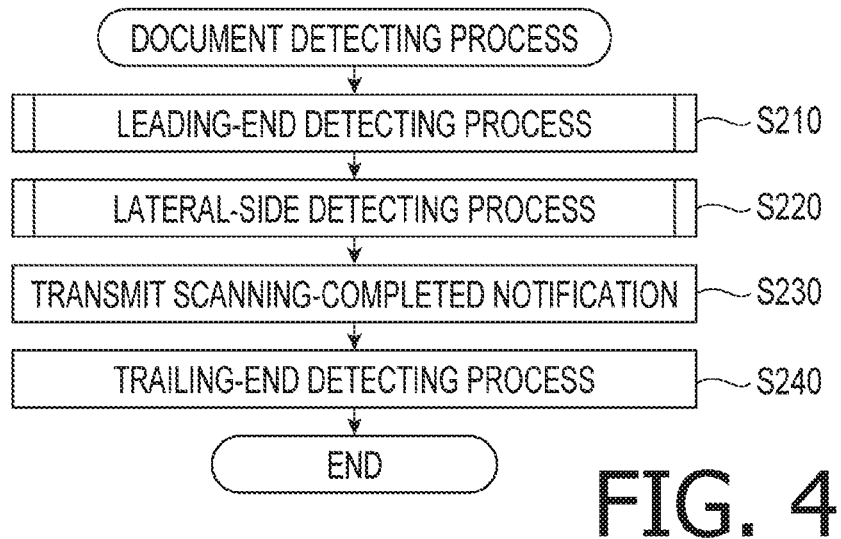
FIG. 4 is a flowchart showing a procedure of a document detecting process to be performed by a document detector of the image scanner in the illustrative embodiment according to one or more aspects of the present disclosure.
Figure 5:
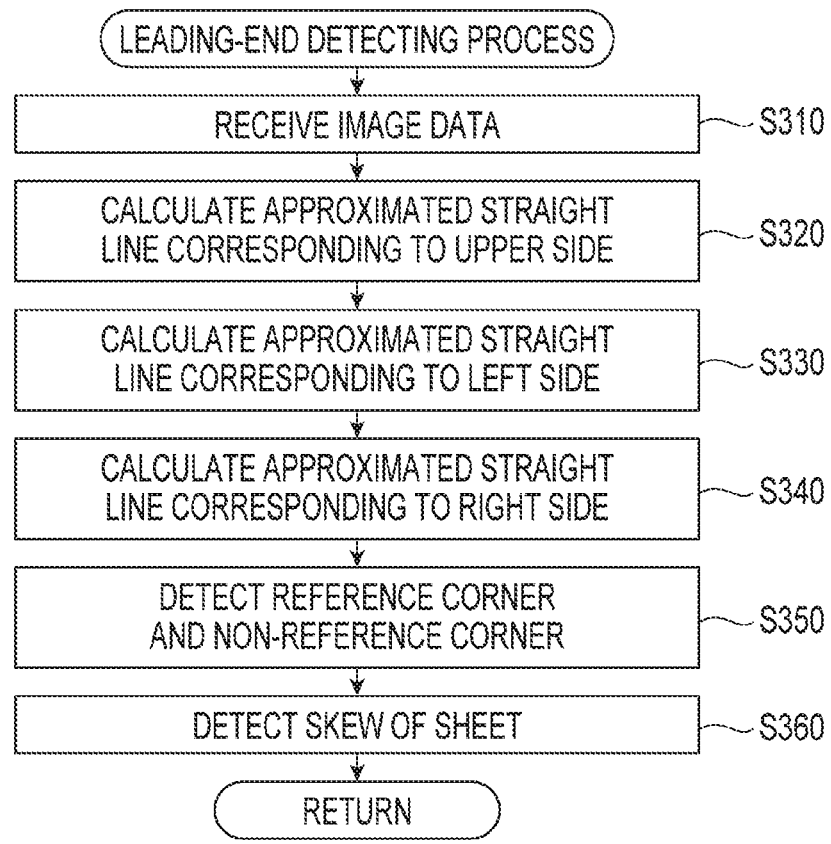
FIG. 5 is a flowchart showing a procedure of a leading-end detecting process to be performed by the document detector in the illustrative embodiment according to one or more aspects of the present disclosure.

In response to being activated when the scanning process has been started, the document detector 57 starts a document detecting process (see FIG. 4). Then, the document detector 57 performs a leading-end detecting process shown in FIG. 5 (S210). In the leading-end detecting process, the document detector 57 receives, from the binarizer 55, image data of a particular number N of lines from a scanning start position of the line image sensor 10 (S310). Hereinafter, the image data received in S310 may be referred to as the "leading-end image data." For instance, the leading-end image data may represent a scanned image having a length of a few centimeters (e.g., 3 cm) downstream from the scanning start position of the line image sensor 10 in the sub scanning direction. In response to completely receiving the leading-end image data from the binarizer 55 after the line image sensor 10 has completed image scanning of the particular number N of lines, the document detector 57 goes to S320.

In S320, the document detector 57 detects edge points corresponding to the upper side of the sheet Q in a scanned image represented by the acquired leading-end image data, and calculates, from the detected edge points, an approximated straight line corresponding to the upper side of the sheet Q. When the sheet Q is not skewed, the upper side of the sheet Q is parallel to the main scanning direction and perpendicular to the sub scanning direction.

Subsequently, in S330, the document detector 57 detects edge points corresponding to the left side of the sheet Q in the scanned image represented by the leading-end image data, and calculates, from the detected edge points, an approximated straight line corresponding to the left side of the sheet Q. Next, in S340, the document detector 57 detects edge points corresponding to the right side of the sheet Q in the scanned image represented by the leading-end image data, and calculates, from the detected edge points, an approximated straight line corresponding to the right side of the sheet Q. When the sheet Q is not skewed, the left and right sides of the sheet Q are perpendicular to the main scanning direction and parallel to the sub scanning direction.

Afterward, in S350, the document detector 57 detects a position of an intersection between the approximated straight line corresponding to the upper side and the approximated straight line corresponding to the left side, as a position of the reference corner QA at a left end of the upper side of the sheet Q. Further, in S350, the document detector 57 detects a position of an intersection between the approximated straight line corresponding to the upper side and the approximated straight line corresponding to the right side, as a position of the non-reference corner QB at a right end of the upper side of the sheet Q. Then, in S360, the document detector 75 detects a skew of the document Q based on an inclination of the approximated straight line corresponding to the upper side. Thereafter, the document detector 57 terminates the leading-end detecting process.

Figure 6:
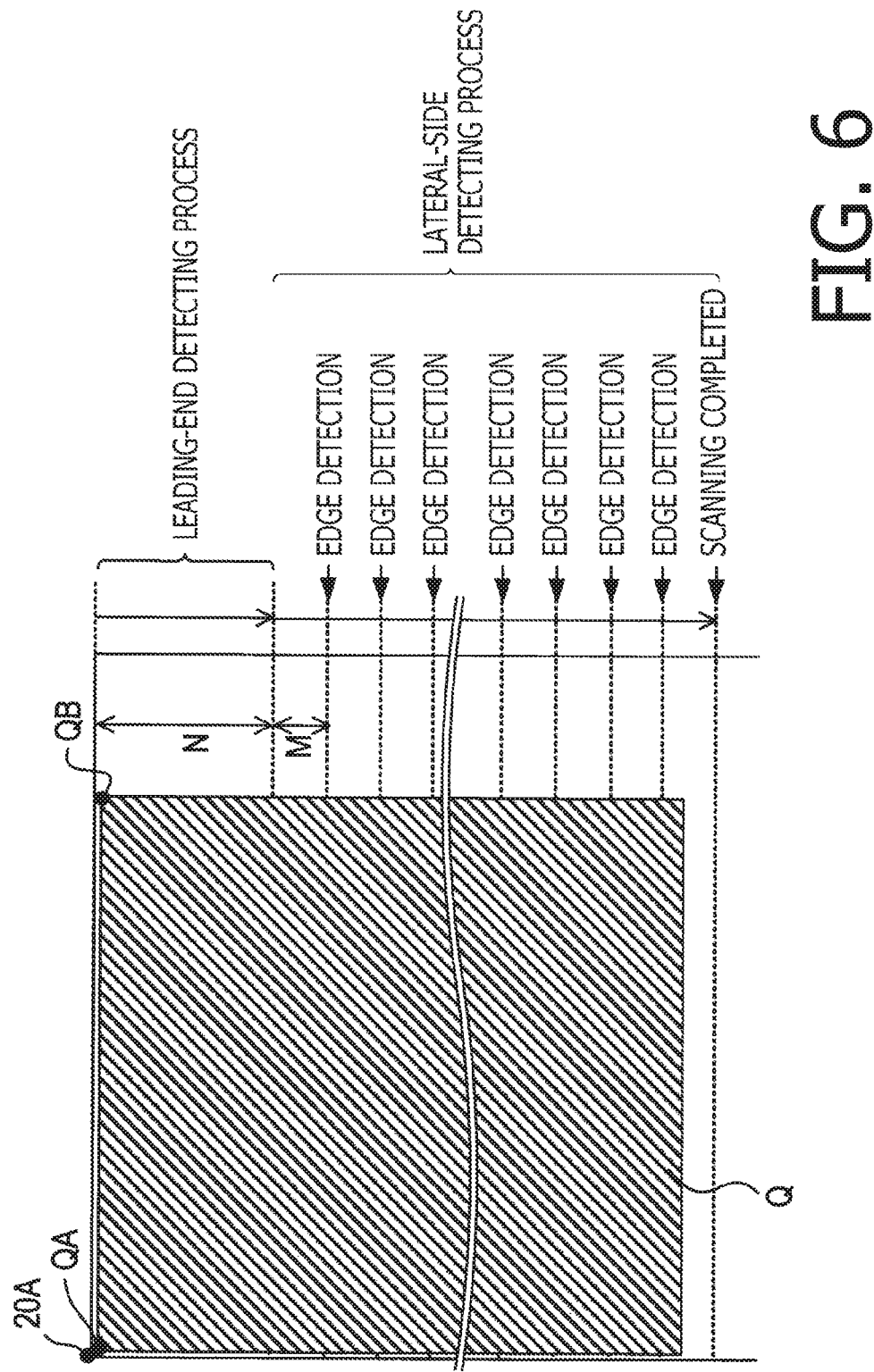
FIG. 6 is an illustration for explaining the leading-end detecting process and a lateral-side detecting process to be performed by the document detector in the illustrative embodiment according to one or more aspects of the present disclosure.

After completion of the leading-end detecting process (S210), the document detector 57 performs a lateral-side detecting process (S220). In the lateral-side detecting process (S220), as shown in FIG. 6, the document detector 57 performs an edge detecting process each time the line image sensor 10 completes image scanning of a predetermined number M of lines in the sub scanning direction. In each edge detecting process, the document detector 57 detects a right edge corresponding to the right side of the sheet Q, based on image data (hereinafter referred to as "lateral-side image data") representing a scanned image of the predetermined number M of lines.

The predetermined number M of the lines included in each piece of lateral-side image data is much smaller than the particular number N of the lines included in the leading-end image data. For instance, the predetermined number M may be 32. Thus, by setting the predetermined number M much smaller than the particular number N, it is possible to terminate an unnecessary scanning operation immediately after the line image sensor 10 has passed a trailing end of the sheet Q in the sub scanning direction. FIG. 6 shows, merely as a conceptual example, an execution interval (corresponding to the predetermined number M of lines) between consecutive two of the repeated edge detecting processes in the sub scanning direction. Hence, it is noted that a width, in the sub scanning direction, of the execution interval exemplified in FIG. 6 should not be compared with any other elements shown in FIG. 6 such as a size of the sheet Q and a width (corresponding to the particular number N of lines), in the sub scanning direction, of the scanned image corresponding to the leading-end image data acquired in the leading-end detecting process.

In contrast to the leading-end image data acquired in the leading-end detecting process, the lateral-side image data does not have a sufficient number of lines to accurately calculate the approximated straight line corresponding to the right side. Therefore, in the edge detecting process, the right edge may be detected in a below-mentioned method.

Figure 7:
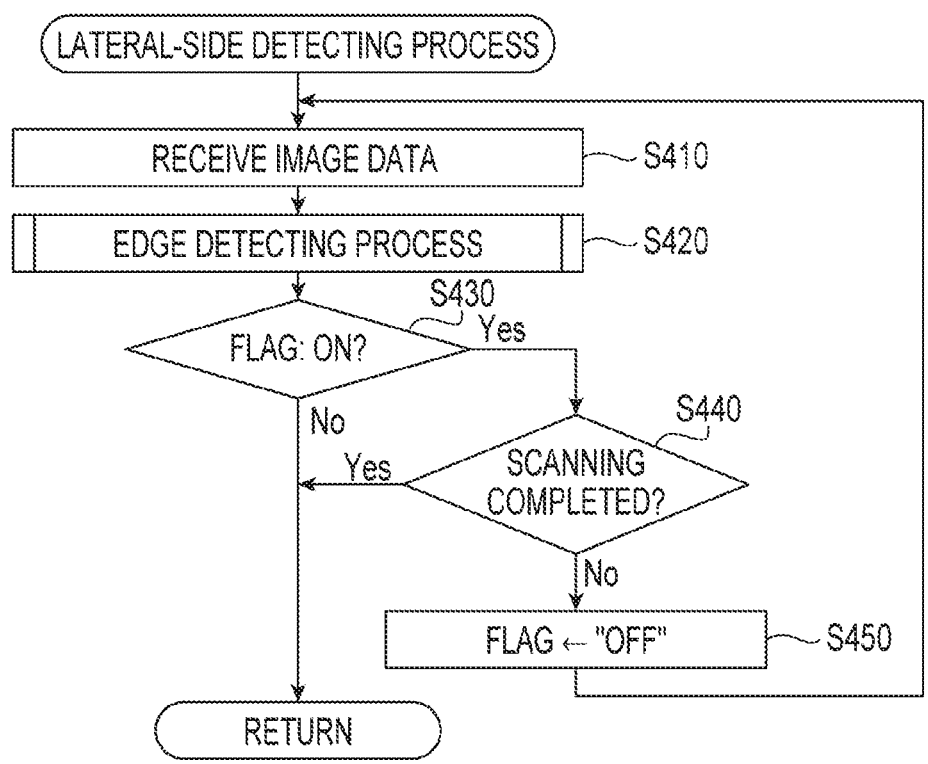
FIG. 7 is a flowchart showing a procedure of the lateral-side detecting process to be performed by the document detector in the illustrative embodiment according to one or more aspects of the present disclosure.

Specifically, in S220, the document detector 57 starts the lateral-side detecting process (see FIG. 7). In the lateral-side detecting process, each time receiving lateral-side image data from the binarizer 55 in S410 after the line image sensor 10 performs image scanning of the predetermined number M of lines, the document detector 57 performs the edge detecting process (see FIGS. 8 and 9) in S420. In the edge detecting process, the document detector 57 sets a document flag to "ON" when a document edge corresponding to the left side or the right side of the sheet Q has been detected, and maintains the document flag to be "OFF" until a document edge is detected.

In response to determining that the document flag is set to "ON" in the edge detecting process in S420 (S430: Yes), the document detector 57 determines whether image scanning has been performed up to a downstream end of a maximum scanning range of the image reader 1 in the sub scanning direction (S440). Then, in response to determining that image scanning has not been performed up to the downstream end of the maximum scanning range of the image reader 1 in the sub scanning direction (S440: No), the document detector 57 resets the document flag to "OFF" (S450). Thereafter, the document detector 57 goes back to S410. In response to receiving another piece of lateral-side image data from the binarizer 55 (S410) after the line image sensor 10 performs image scanning of a next group of lines of the predetermined number M, the document detector 57 performs the edge detecting process using the another piece of lateral-side image data (S420).

Thus, the document detector 57 repeatedly performs the edge detecting process (S420) until a document edge is not detected or until image scanning is completed up to the downstream end of the maximum scanning range in the sub scanning direction. When the document flag is "OFF" with no document edge detected (S430: No), or image scanning has been completed up to the downstream end of the maximum scanning range in the sub scanning direction (S440: Yes), the document detector 57 terminates the lateral-side detecting process (S220 in FIG. 4). Afterward, the document detector 57 goes to S230 (see FIG. 4).

In S230, the document detector 57 provides the main controller 30 with the scanning-completed notification that image scanning from the leading end to the trailing end of the sheet Q in the sub scanning direction has been completed. In response to receiving the scanning-completed notification, the main controller 30 causes the line image sensor 10 to stop repeatedly performing the line scanning via the scanning controller 40, and causes the moving mechanism 60 to stop moving the line image sensor 10 via the motor controller 70.

Subsequently, in S240, the document detector 57 performs a trailing-end detecting process. In the trailing-end detecting process, based on the last-acquired lateral-side image data, the document detector 57 detects the trailing end of the sheet Q, i.e., edge points corresponding to the lower side of the sheet Q, and calculates, from the detected edge points, an approximated straight line corresponding to the lower side of the sheet Q. For instance, in the illustrative embodiment, the document detector 57 may detect the edge points by referring to pixels from a downstream end to an upstream end, in the sub scanning direction, of the scanned image represented by the lateral-side image data, thereby calculating the approximated straight line. Afterward, the document detector 57 terminates the document detecting process shown in FIG. 4.

The document detector 57 provides the main controller 30 with positional information of the lower side of the sheet Q detected in the trailing-end detecting process, positional information of the reference corner QA and the non-reference corner QB detected in the leading-end detecting process, and positional information of the upper side of the sheet Q detected in the leading-end detecting process. Based on those pieces of positional information, the main controller 30 performs the trimming process. Furthermore, in order to attain a more appropriate trimming process, the document detector 57 may provide the main controller 30 with positional information of the document edges (i.e., the left and right sides of the sheet Q) detected in the lateral-side detecting process.

Subsequently, the edge detecting process (S420) will be described in detail. After starting the edge detecting process shown in FIGS. 8 and 9, the document detector 57 determines whether a right edge position (i.e., a position of a document edge corresponding to the right side of the sheet Q) has been detected in an already-performed edge detecting process (S510). In S510 of the edge detecting process performed for the first time after the start of the scanning process, the document detector 57 determines that a right edge position has not been detected in any already-performed edge detecting process (S510: No). Meanwhile, in S510 of the edge detecting process performed for the second or later time after the start of the scanning process, when a right edge position has been detected in at least one of the already-performed edge detecting processes, the document detector 57 makes an affirmative determination (S510: Yes). In another example, when a right edge position has been detected in a previous edge detecting process, the document detector 57 may make an affirmative determination in S510 (S510: Yes). In this case, even though a right edge position has been detected in an edge detecting process before the previous edge detecting process, when a right edge position has not been detected in the previous edge detecting process, the document detector 57 may make a negative determination in S510 (S510: No).

In response to determining that a right edge position has not been detected in an already-performed edge detecting process (S510: No), the document detector 57 sets a center of a detection range (for detecting a right edge) in the main scanning direction, based on the non-reference corner QB and the skew of the sheet Q that have been detected in the leading-end detecting process (S520). Specifically, in S520, the document detector 57 specifies a position (e.g., a center position), in the main scanning direction, of a straight line passing through the non-reference corner QB and having an inclination corresponding to the skew of the sheet Q, within a scanned image represented by lateral-side image data to be processed. It is noted that the straight line defined here corresponds to the right side of the sheet Q. Further, in S520, the document detector 57 sets the specified position as the center of the detection range in the main scanning direction.

Meanwhile, in response to determining that a right edge position has been detected in an already-performed edge detecting process (S510: Yes), the document detector 57 sets the center of the detection range, based on a latest one of right edge positions ever detected (i.e., based on a right edge position detected in the previous edge detecting process) (S530). For example, in S530, the document detector 57 may set the latest right edge position as the center of the detection range in the main scanning direction. In another example of S530, the document detector 57 may specify a position (e.g., a center position), in the main scanning direction, of a straight line passing through the latest right edge position and having the inclination corresponding to the skew of the sheet Q, within the scanned image represented by the lateral-side image data to be processed, and then, may set the specified position as the center of the detection range in the main scanning direction.

Afterward, the document detector 57 sets, as the detection range in the main scanning direction, a range in the main scanning direction between a left end that is positioned L pixels leftward away from the center set in S520 or S530 in the main scanning direction and a right end that is positioned L pixels rightward away from the same center in the main scanning direction (S540). Next, the document detector 57 performs a consecutiveness determining process shown in FIGS. 10A and 10B (S550). The value "L" may be 128. The left in the main scanning direction corresponds to the left of the sheet Q. The right in the main scanning direction corresponds to the right of the sheet Q. With respect to the right edge position, the left in the main scanning direction corresponds to the inside of the sheet Q, and the right in the main scanning direction corresponds to the outside of the sheet Q.

In the consecutiveness determining process (S550), the document detector 57 detects, in the main scanning direction, a pixel corresponding to a right edge within the detection range in the main scanning direction, and refers to a plurality of pixels in the sub scanning direction on the basis of the detected pixel, thereby detecting a group of pixels consecutive in the sub scanning direction and corresponding to right edges.

After starting the consecutiveness determining process (see FIGS. 10A and 10B) in S550, first, the document detector 57 sets, as a target line, a head line of a detection range in the sub scanning direction (S710). The head line of the detection range in the sub scanning direction corresponds to a first line of lateral-side image data to be processed. The detection range in the sub scanning direction may be a range from the first line to a fourth line of the lateral-side image data to be processed.

Afterward, the document detector 57 sets, as a start pixel, a rightmost pixel of the target line within the detection range in the main scanning direction (S720). Then, the document detector 57 determines whether the start pixel is a black pixel (S730). Here, "determining whether the start pixel is a black pixel" is equivalent to "determining whether the start pixel corresponds to a right edge."

In response to determining that the start pixel is not a black pixel (S730: No), the document detector 57 resets, as a new start pixel, a left pixel adjacent to the current start pixel on the target line (S740). Then, the document detector 57 determines whether the newly-set start pixel is within the detection range in the main scanning direction (S750). In response to determining that the newly-set start pixel is within the detection range in the main scanning direction (S750: Yes), the document detector 57 goes to S730 and determines whether the newly-set start pixel is a black pixel.

Thus, the document detector 57 sequentially sets, as the start pixel, each pixel from a rightmost pixel to a leftmost pixel on the target line within the detection range in the main scanning direction (S720 and S740), and determines whether the start pixel is a black pixel (S730). In response to determining that the start pixel is out of the detection range in the main scanning direction (S750: No), i.e., in response to determining that the newly-set start pixel goes beyond the left end of the detection range in the main scanning direction (S750: No), the document detector 57 changes the target line to a line positioned one-line lower than the current target line (S760). Here, "changing the target line to a line positioned one-line lower than the current target line" is equivalent to "resetting, as a new target line, a line downstream adjacent to the current target line in the sub scanning direction."

Thereafter, the document detector 57 determines whether the newly-set target line is within the detection range in the sub scanning direction (S770). It is noted that a final line of the detection range in the sub scanning direction is positioned a specific number of lines upstream of a final line of the lateral-side image data in the sub scanning direction. The specific number of lines is necessary for judging the consecutiveness of right edges in the sub scanning direction.

In response to determining that the newly-set target line is within the detection range in the sub scanning direction (S770: Yes), the document detector 57 goes to S720. In S720, the document detector 57 sets, as the start pixel, a rightmost pixel of the newly-set target line within the detection range in the main scanning direction. Then, the document detector 57 performs S730 and the following steps.

In response to determining that the start pixel is a black pixel (S730: Yes), the document detector 57 performs a consecutive-pixel-number calculating process (S790). After starting the consecutive-pixel-number calculating process, the document detector 57 determines whether the sheet Q is skewed, based on the skew of the sheet Q detected in the leading-end detecting process (S910). In response to determining that the sheet Q is not skewed (S910: No), the document detector 57 sets a group of reference pixels in the sub scanning direction on the basis of the start pixel, in accordance with one or more rules defined for an un-skewed document sheet (S920). Specifically, the document detector 57 sets the group of reference pixels in the sub scanning direction, as shown in FIG. 12A.

Figure 12A:
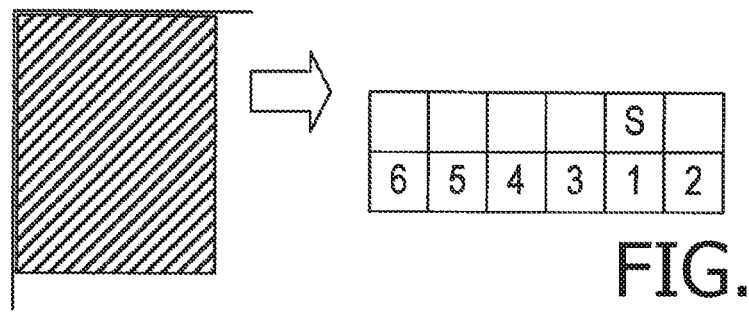
FIG. 12A is an illustration for explaining how to set a group of reference pixels on the basis of a start pixel when a document sheet (hereinafter, simply referred to as a "sheet") is not skewed, in the illustrative embodiment according to one or more aspects of the present disclosure.

Each rectangular block shown in FIG. 12A represents a pixel. A rectangular block with a character "S" corresponds to a start pixel. Specifically, the rectangular block with a character "S" corresponds to a latest start pixel set in S720 or S740 before the consecutive-pixel-number calculating process (S790) is performed.

The reference pixels included in the group are six pixels indicated with numerals of 1 to 6, respectively. A lower side of FIG. 12A corresponds to a downstream side in the sub scanning direction. The numerals of 1 to 6 assigned to the six reference pixels represent reference orders. As will be described, the six reference pixels are referred to in sequence according to the numerals assigned thereto.

More specifically, in S920, the document detector 57 sets, as the group of reference pixels, six pixels that are consecutively arranged, on a line positioned one-line lower than the start pixel, from a position shifted by one pixel rightward from the start pixel in the main scanning direction to a position shifted by four pixels leftward from the start pixel in the main scanning direction.

Figure 12B:
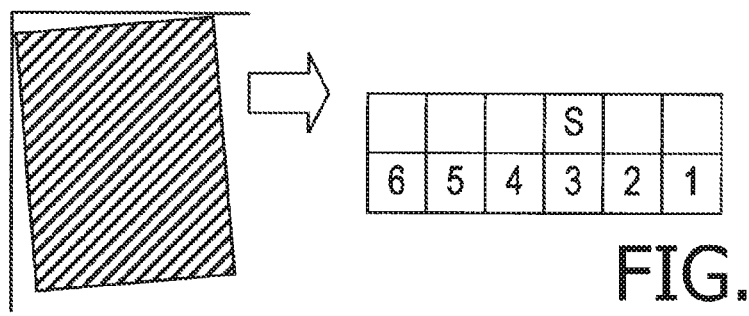
FIG. 12B is an illustration for explaining how to set a group of reference pixels on the basis of the start pixel when the sheet is skewed counterclockwise, in the illustrative embodiment according to one or more aspects of the present disclosure.

In response to determining that the sheet Q is skewed (S910: Yes), the document detector 57 determines whether the sheet Q is skewed counterclockwise (S930). In response to determining that the sheet Q is skewed counterclockwise (S930: Yes), the document detector 57 sets a group of reference pixels on the basis of the start pixel, in accordance with one or more rules defined for a document sheet skewed counterclockwise (S940). Specifically, the document detector 57 sets the group of reference pixels as shown in FIG. 12B. In the same manner as shown in FIG. 12A, a rectangular block with a character "S" corresponds to a latest start pixel set in S720 or S740 before the consecutive-pixel-number calculating process (S790) is performed. As shown in FIG. 12B, six reference pixels are indicated with numerals of 1 to 6, respectively. The numerals of 1 to 6 assigned to the six reference pixels represent reference orders, and the six reference pixels are referred to in sequence according to the numerals. More specifically, in S940, the document detector 57 sets, as the group of reference pixels, six pixels consecutively arranged, on a line positioned one-line lower than the start pixel, from a position shifted by two pixels rightward from the start pixel in the main scanning direction to a position shifted by three pixels leftward from the start pixel in the main scanning direction.

Figure 12C:
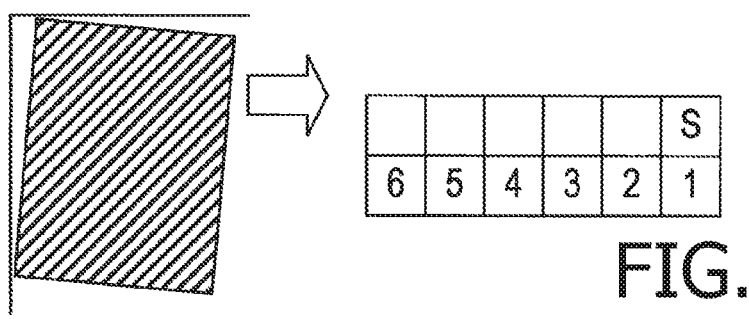
FIG. 12C is an illustration for explaining how to set a group of reference pixels on the basis of the start pixel when the sheet is skewed clockwise, in the illustrative embodiment according to one or more aspects of the present disclosure.

In response to determining that the sheet Q is skewed clockwise (S930: No), the document detector 57 sets a group of reference pixels on the basis of the start pixel, in accordance with one or more rules defined for a document sheet skewed clockwise (S950). Specifically, the document detector 57 sets the group of reference pixels as shown in FIG. 12C. In the same manner as shown in FIG. 12A, a rectangular block with a character "S" corresponds to a latest start pixel set in S720 or S740 before the consecutive-pixel-number calculating process (S790) is performed. As shown in FIG. 12C, six reference pixels are indicated with numerals of 1 to 6, respectively. The numerals of 1 to 6 assigned to the six reference pixels represent reference orders, and the six reference pixels are referred to in sequence according to the numerals. More specifically, in S950, the document detector 57 sets, as the group of reference pixels, six pixels consecutively arranged, on a line positioned one-line lower than the start pixel, from the same position (i.e., a position just beneath the start pixel) as the start pixel in the main scanning direction to a position shifted by five pixels leftward from the start pixel in the main scanning direction.

After setting the reference pixels in S920, S940, or S950, the document detector 57 refers to first to fourth reference pixels in sequence, and determines whether at least one of the first to fourth reference pixels is a black pixel (S960). When each of the reference pixels is expressed as an "i-th reference pixel," the numeral "i" of the i-th reference pixel corresponds to the numeral assigned to each reference pixel shown in FIGS. 12A to 12C. The determination in S960 corresponds to detecting a pixel consecutive from the start pixel in the sub scanning direction.

In response to determining that at least one of the first to fourth reference pixels is a black pixel (S960: Yes), the document detector 57 increments the number C of consecutive pixels by one (S990). Then, the document detector 57 determines whether the number C of consecutive pixels is more than a first threshold TH1 (S1000). For instance, the first threshold TH1 may be 24 when the predetermined number M of the lines to be scanned in the sub scanning direction in each edge detecting process is equal to 32.

In response to determining that the number C of consecutive pixels is more than the first threshold TH1 (S1000: Yes), the document detector 57 terminates the consecutive-pixel-number calculating process. Meanwhile, in response to determining that the number C of consecutive pixels is equal to or less than the first threshold TH1 (S1000: No), the document detector 57 goes to S1010. In S1010, the document detector 57 sets a new group of reference pixels arranged on a line positioned one-line lower than the group of reference pixels currently referred to. Specifically, on the basis of a specific black pixel having an earliest reference order (i.e., a black pixel expressed with a smallest numeral "i") among black pixels included in the group of reference pixels currently referred to, the document detector 57 sets the new group of reference pixels in accordance with the same rules as implemented in S920, S940, or S950 (S1010).

Figures 13A, 13B, 13C:
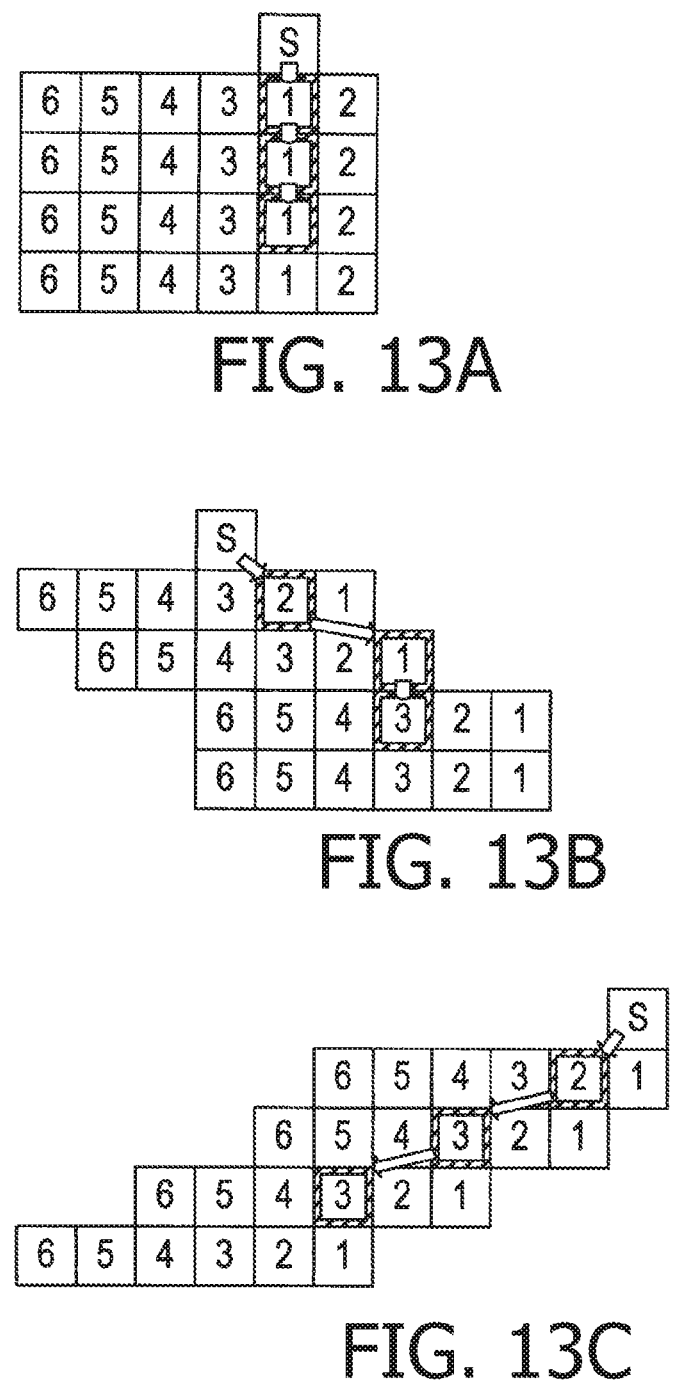

For instance, when the sheet Q is not skewed, the document detector 57 may treat a specific black pixel having an earliest reference order in the same manner as the start pixel, and may set, as a new group of reference pixels, six pixels consecutively arranged, on a line positioned one-line lower than the specific black pixel, from a position shifted by one pixel rightward from the specific black pixel in the main scanning direction to a position shifted by four pixels leftward from the specific black pixel in the main scanning direction. In an example shown in FIG. 13A, the specific black pixel having the earliest reference order on the line positioned one-line lower than the start pixel is a first reference pixel. Therefore, on the basis of the first reference pixel, new reference pixels are set on a line positioned one-line lower than the first reference pixel. In FIG. 13A, each pixel surrounded by a hatched frame corresponds to a "specific black pixel having an earliest reference order." The same applies to FIGS. 13B and 13C.

Likewise, when the sheet Q is skewed counterclockwise, in S1010, the document detector 57 treats a specific black pixel having an earliest reference order among black pixels included in the group of reference pixels currently referred to, in the same manner as the start pixel, and sets, as a new group of reference pixels, six pixels consecutively arranged, on a line positioned one-line lower than the specific black pixel, from a position shifted by two pixels rightward from the specific black pixel in the main scanning direction to a position shifted by three pixels leftward from the specific black pixel in the main scanning direction. In an example shown in FIG. 13B, the specific black pixel having the earliest reference order on the line positioned one-line lower than the start pixel is a second reference pixel. Therefore, on the basis of the second reference pixel, new reference pixels are set on a line positioned one-line lower than the second reference pixel.

Likewise, when the sheet Q is skewed counterclockwise, in S1010, the document detector 57 treats a specific black pixel having an earliest reference order among black pixels included in the group of reference pixels currently referred to, in the same manner as the start pixel, and sets, as a new group of reference pixels, six pixels consecutively arranged, on a line positioned one-line lower than the specific black pixel, from a position shifted by two pixels rightward from the specific black pixel in the main scanning direction to a position shifted by three pixels leftward from the specific black pixel in the main scanning direction. In an example shown in FIG. 13B, the specific black pixel having the earliest reference order on the line positioned one-line lower than the start pixel is a second reference pixel. Therefore, on the basis of the second reference pixel, new reference pixels are set on a line positioned one-line lower than the second reference pixel.

Thus, after setting the new group of reference pixels in S1010, the document detector 57 goes to S960 and determines whether at least one of the first to fourth reference pixels included in the new group of reference pixels is a black pixel.

In response to determining that none of the first to fourth reference pixels is a black pixel (S960: No), the document detector 57 determines whether the number C of consecutive pixels is equal to or more than a predetermined second threshold TH2 (S970). The second threshold TH2 used in S970 is set smaller than the first threshold TH1 used in S1000. For instance, the second threshold TH2 may be 5.

In response to determining that the number C of consecutive pixels is equal to or more than the second threshold TH2 (S970: Yes), the document detector 57 determines whether at least one of the fifth and sixth reference pixels is a black pixel (S980). Thus, in S980, when one or more black pixels consecutive from the start pixel in the sub scanning direction are recognized, even though there is no black pixel in the first to fourth reference pixels, a range of reference pixels to be referred to may be extended to the fifth and sixth reference pixels, so as to further determine whether there is a black pixel in the fifth and sixth reference pixels.

In response to determining that at least one of the fifth and sixth reference pixels is a black pixel (S980: Yes), the document detector 57 goes to S990. Meanwhile, in response to determining that none of the fifth and sixth reference pixels is a black pixel (S980: No), the document detector 57 terminates the consecutive-pixel-number calculating process. Further, the document detector 57 also terminates the consecutive-pixel-number calculating process in response to determining that the number C of consecutive pixels is less than the second threshold TH2 (S970).

After completion of the consecutive-pixel-number calculating process in S790 (see FIG. 10B), the document detector 57 determines whether the number C of consecutive pixels calculated in the consecutive-pixel-number calculating process is more than the first threshold TH1 (S800), in the same manner as determined in S1000.

In response to determining that the number C of consecutive pixels is more than the first threshold TH1 (S800: Yes), the document detector 57 sets a document flag to "ON" (S810). Then, the document detector 57 determines a right edge position (S820). The right edge position determined in S820 corresponds to a detected position of the right edge. For example, in S820, the document detector 57 may determine the position of the start pixel in the main scanning direction as a position of the right edge in the main scanning direction. In another example of S820, the document detector 57 may determine, as a position of the right edge in the main scanning direction, a position of a black pixel having an earliest reference order among a last-set group of reference pixels or a position of a black pixel used as a basis for setting the last-set group of reference pixels. Thereafter, the document detector 57 terminates the consecutiveness determining process.

Meanwhile, in response to determining that the number C of consecutive pixels is equal to or less than the first threshold TH1 (S800: No), the document detector 57 resets, as a new start pixel, a left pixel adjacent to the current start pixel on the target line (S740), and then performs S750 and the following steps. In response to determining that the target line goes out of the detection range in the sub scanning direction without detecting such a start pixel that the number C of consecutive pixels is more than the first threshold TH1 (S770: No), the document detector 57 sets the document flag to "OFF" (S780). Thereafter, the document detector 57 terminates the consecutiveness determining process.

Figure 8:
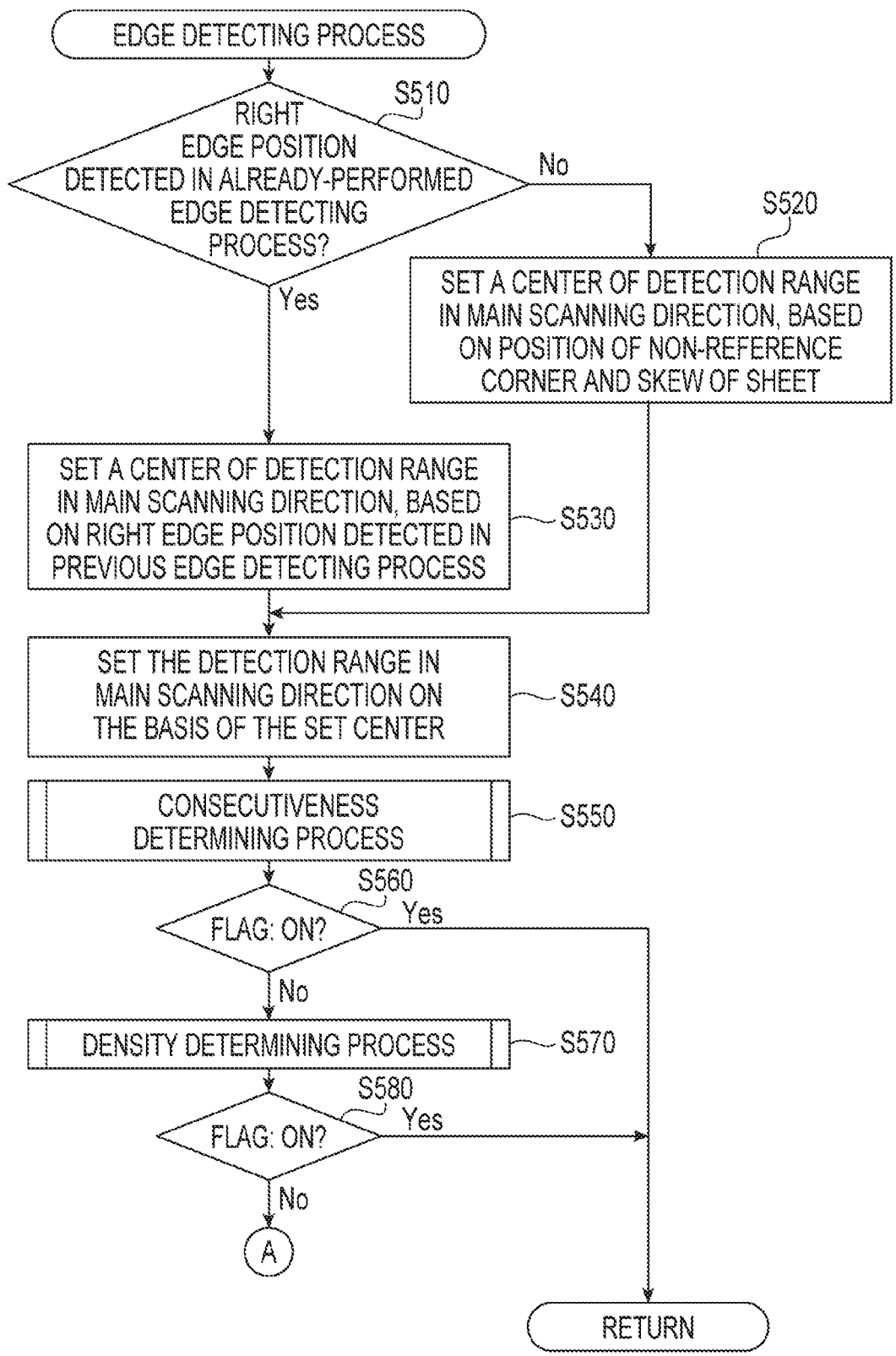
FIGS. 8 and 9 are flowcharts showing a procedure of an edge detecting process to be performed by the document detector in the illustrative embodiment according to one or more aspects of the present disclosure.
Figure 9:
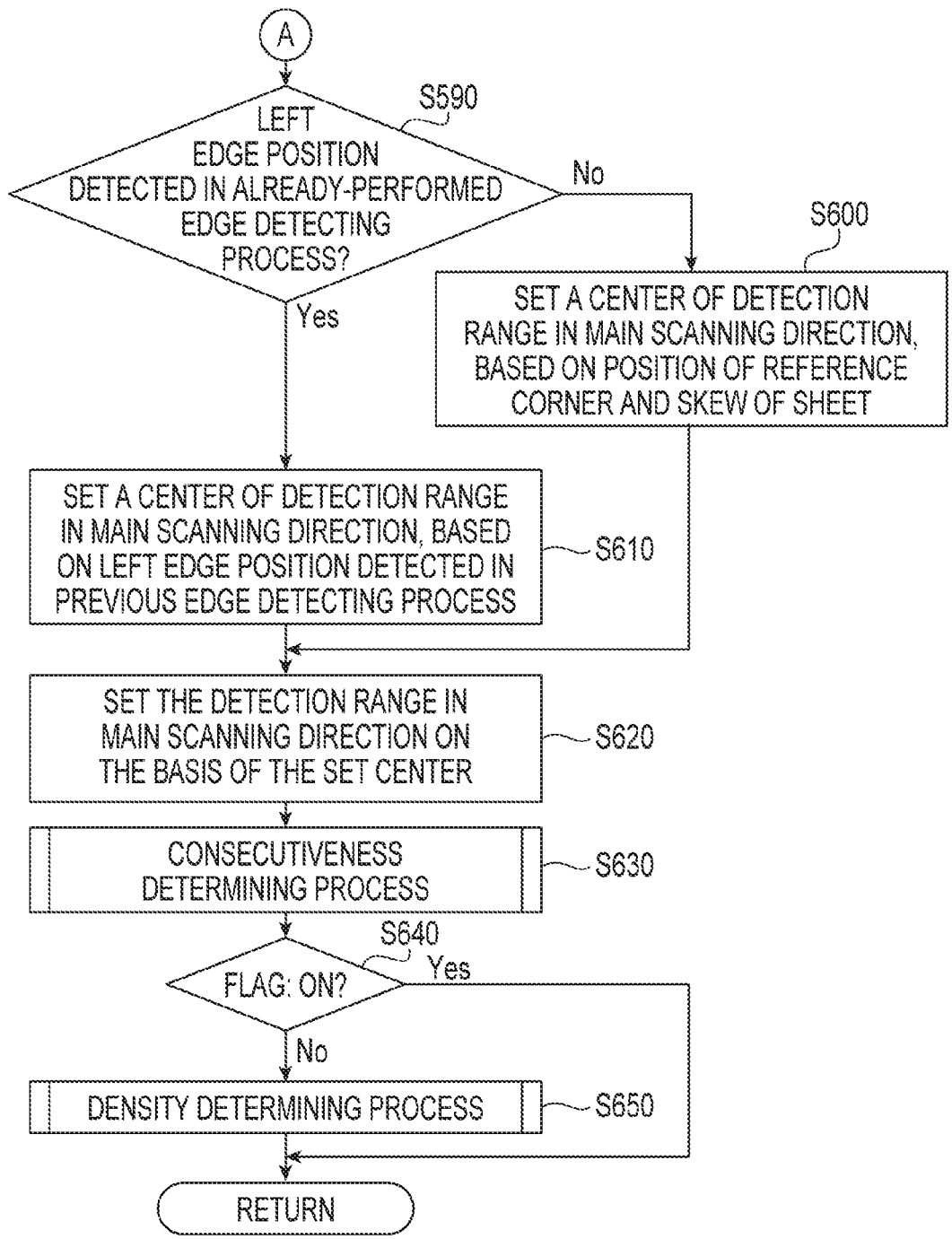

After completion of the consecutiveness determining process in S550, the document detector 57 determines whether the document flag is set to "ON" (S560 in FIG. 8). In response to determining that the document flag is set to "ON" (S560: Yes), the document detector 57 terminates the edge detecting process. Meanwhile, in response to determining that the document flag is not set to "ON" (S560: No), the document detector 57 performs a density determining process shown in FIG. 14 (S570).

Figure 14:
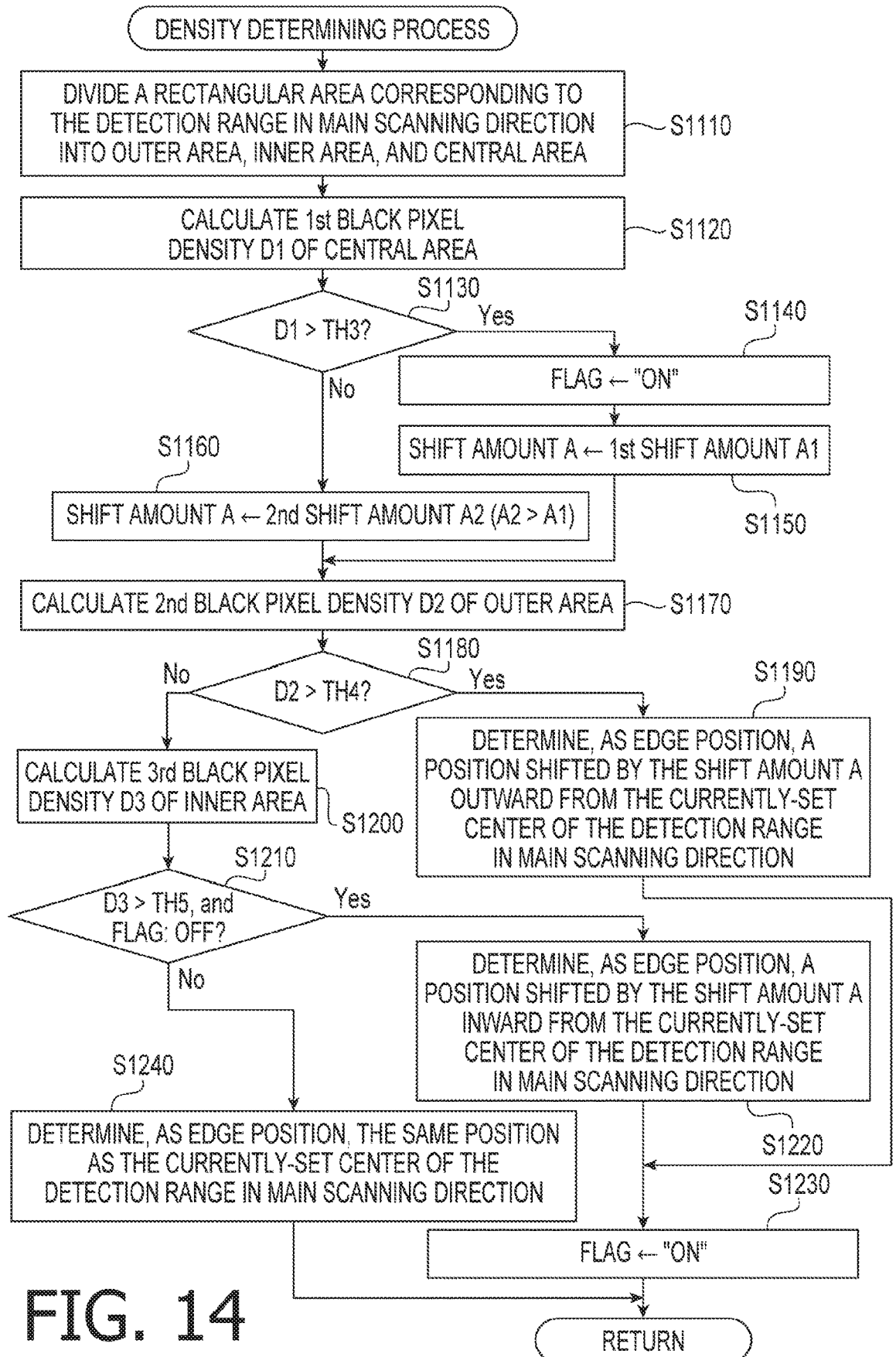
FIG. 14 is a flowchart showing a procedure of a density determining process to be performed by the document detector in the illustrative embodiment according to one or more aspects of the present disclosure.
Figure 15:
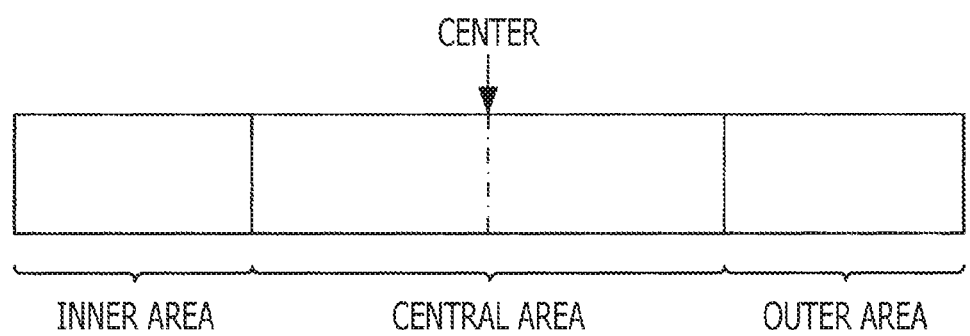
FIG. 15 is an illustration for explaining how to divide a rectangular area corresponding to a detection range in a main scanning direction into an outer area, an inner area, and a central area in the density determining process, in the illustrative embodiment according to one or more aspects of the present disclosure.

After starting the density determining process (see FIG. 14), the document detector 57 divides a rectangular area corresponding to the detection range in the main scanning direction into an outer area, an inner area, and a central area as shown in FIG. 15 (S1110). The rectangular area has a width, in the sub scanning direction, from the head line to the final line of the lateral-side image data to be processed. Further, the rectangular area includes the detection range in the main scanning direction, and has the same number of pixels in the main scanning direction as the detection range in the main scanning direction.

The outer area is positioned further outward (i.e., rightward) of the sheet Q than an outer end (i.e., a right end) of the central area in the main scanning direction. The inner area is positioned further inward (i.e., leftward) of the sheet Q than an inner end (i.e., a left end) of the central area in the main scanning direction. Specifically, the document detector 57 divides the rectangular area into four segments in the main scanning direction, and sets two middle segments of the four segments as the central area. Further, the document detector 57 sets a right segment adjacent to the central area as the outer area, and sets a left segment adjacent to the central area as the inner area.

Following S1110, the document detector 57 calculates a first black pixel density D1 (S1120). The first black pixel density D1 represents a density of black pixels in the central area. Specifically, the first black pixel density D1 is a value obtained by dividing the number of black pixels in the central area by a total number of pixels in the central area. The document detector 57 determines whether the first black pixel density D1 is more than a predetermined third threshold TH3 (S1130). For instance, the third threshold TH3 may be 2.34%.

In response to determining that the first black pixel density D1 of the central area is more than the third threshold TH3 (S1130: Yes), the document detector 57 sets the document flag to "ON" (S1140). Then, the document detector 57 sets a below-mentioned shift amount A to a predetermined first shift amount A1 (S1150). Afterward, the document detector 57 goes to S1170.

In response to determining that the first black pixel density D1 of the central area is equal to or less than the third threshold TH3 (S1130: No), the document detector 57 sets the shift amount A to a predetermined second shift amount A2 (S1160). Afterward, the document detector 57 goes to S1170. It is noted that the second shift amount A2 is larger than the first shift amount A1.

For instance, the first shift amount A1 may be identical to the number of pixels within the outer area or the inner area in the main scanning direction. Further, the second shift amount A2 may be identical to the number of pixels within the central area in the main scanning direction. The number of pixels within the central area in the main scanning direction is twice as large as the number of pixels within the outer area or the inner area in the main scanning direction. For instance, when the number of pixels within the rectangular area in the main scanning direction is 256, the first shift amount Al and the second shift amount A2 may be 64 and 128, respectively.

In S1170, the document detector 57 calculates a second black pixel density D2 (S1170). The second black pixel density D2 represents a density of black pixels in the outer area. Specifically, the second black pixel density D2 is a value obtained by dividing the number of black pixels in the outer area by a total number of pixels in the outer area. The document detector 57 determines whether the second black pixel density D2 is more than a predetermined fourth threshold TH4 (S1180). For instance, the fourth threshold TH4 may be 4.68%.

In response to determining that the second black pixel density D2 is more than the fourth threshold TH4 (S1180: Yes), the document detector 57 determines, as the right edge position, a position shifted by the shift amount A outward from the currently-set center of the detection range in the main scanning direction (S1190). Afterward, the document detector 57 sets the document flag to "ON" (S1230), and terminates the density determining process.

In response to determining that the second black pixel density D2 is equal to or less than the fourth threshold TH4 (S1180: No), the document detector 57 calculates a third black pixel density D3 (S1200). The third black pixel density D3 represents a density of black pixels in the inner area. Specifically, the third black pixel density D3 is a value obtained by dividing the number of black pixels in the inner area by a total number of pixels in the inner area. The document detector 57 determines whether the third black pixel density D3 is more than a predetermined fifth threshold TH5 with the document flag set to "OFF" (S1210). For instance, the fifth threshold TH5 may be 4.68%.

In response to determining that the third black pixel density D3 is more than the fifth threshold TH5 with the document flag set to "OFF" (S1210: Yes), the document detector 57 determines, as the right edge position, a position shifted by the shift amount A inward from the currently-set center of the detection range in the main scanning direction (S1220). Afterward, the document detector 57 sets the document flag to "ON" (S1230), and terminates the density determining process.

Meanwhile, in response to determining that the document flag is "ON" or that the third black pixel density D3 is equal to or less than the fifth threshold TH5 (S1210: No), the document detector 57 determines, as the right edge position, the same position as the currently-set center of the detection range in the main scanning direction (S1240). Nonetheless, when the document flag is "OFF," actually, the right edge position is not detected or determined. Namely, when the document flag is "OFF," the document detector 57 may not perform S1240. Afterward, the document detector 57 terminates the density determining process.

As shown in FIG. 8, after completion of the density determining process in S570, the document detector 57 determines whether the document flag is set to "ON" (S580). In response to determining that the document flag is set to "ON" (S580: Yes), the document detector 57 terminates the edge detecting process. Meanwhile, in response to determining that the document flag is set to "OFF" (S580: No), the document detector 57 goes to S590. Then, in S590 to S650, the document detector 57 performs substantially the same operations as executed in S510 to S570, to detect the left edge.

Specifically, in S590, the document detector 57 determines whether a left edge position (i.e., a position of a document edge corresponding to the left side of the sheet Q) has been detected in an already-performed edge detecting process (S590). In response to determining that a left edge position has not been detected in an already-performed edge detecting process (S590: No), the document detector 57 sets a center of a detection range (i.e., a range for detecting a left edge) in the main scanning direction, based on the reference corner QA and the skew of the sheet Q that have been detected in the leading-end detecting process (S600). Specifically, in S600, the document detector 57 specifies a position (e.g., a center position in the main scanning direction) on a straight line passing through the reference corner QA and having the inclination corresponding to the skew of the sheet Q, within the scanned image represented by the lateral-side image data to be processed. Further, in S600, the document detector 57 sets the specified position as the center of the detection range in the main scanning direction.

In response to determining that a left edge position has been detected in an already-performed edge detecting process (S590: Yes), the document detector 57 sets the center of the detection range, based on a latest one of left edge positions ever detected (i.e., based on a left edge position detected in the previous edge detecting process) (S610). For example, in S610, the document detector 57 may set the latest left edge position as the center of the detection range in the main scanning direction. In another example of S610, the document detector 57 may specify a position (e.g., a center position in the main scanning direction) on a straight line passing through the latest left edge position and having the inclination corresponding to the skew of the sheet Q, within the scanned image represented by the lateral-side image data to be processed, and then, may set the specified position as the center of the detection range in the main scanning direction.

Afterward, the document detector 57 sets, as the detection range in the main scanning direction, a range in the main scanning direction between a left end that is positioned L pixels leftward away from the center set in S600 or S610 in the main scanning direction and a right end that is positioned L pixels rightward away from the same center in the main scanning direction (S620). Then, the document detector 57 performs the consecutiveness determining process shown in FIGS. 10A and 10B (S630).

Figure 10A:
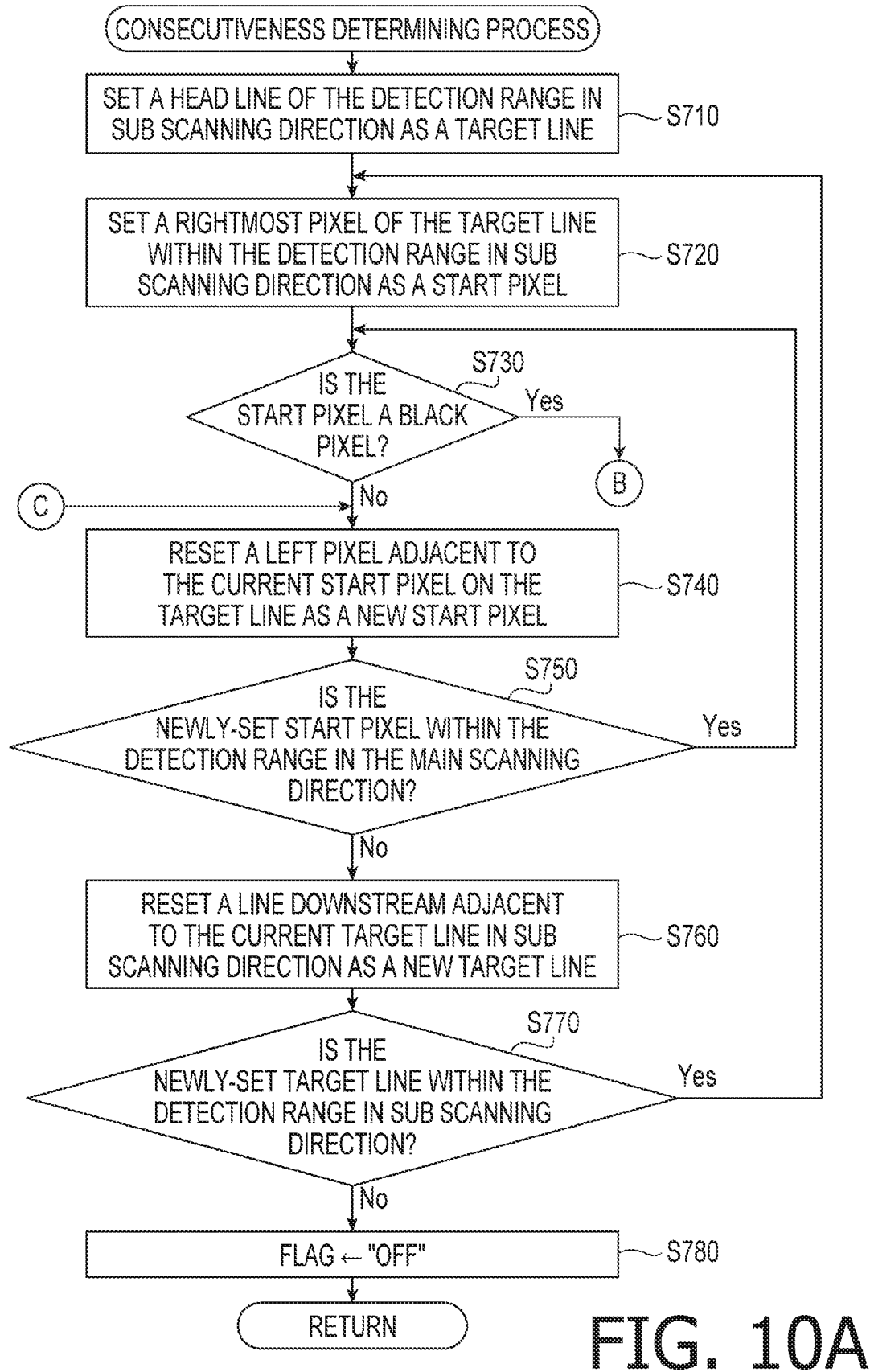
FIGS. 10A and 10B are flowcharts showing a procedure of a consecutiveness determining process to be performed by the document detector in the illustrative embodiment according to one or more aspects of the present disclosure.
Figure 10B:
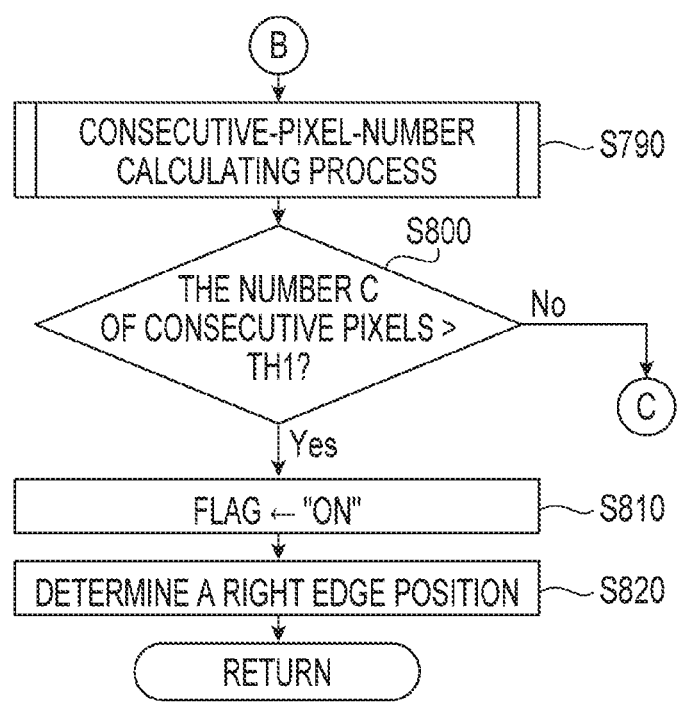
Figure 11:
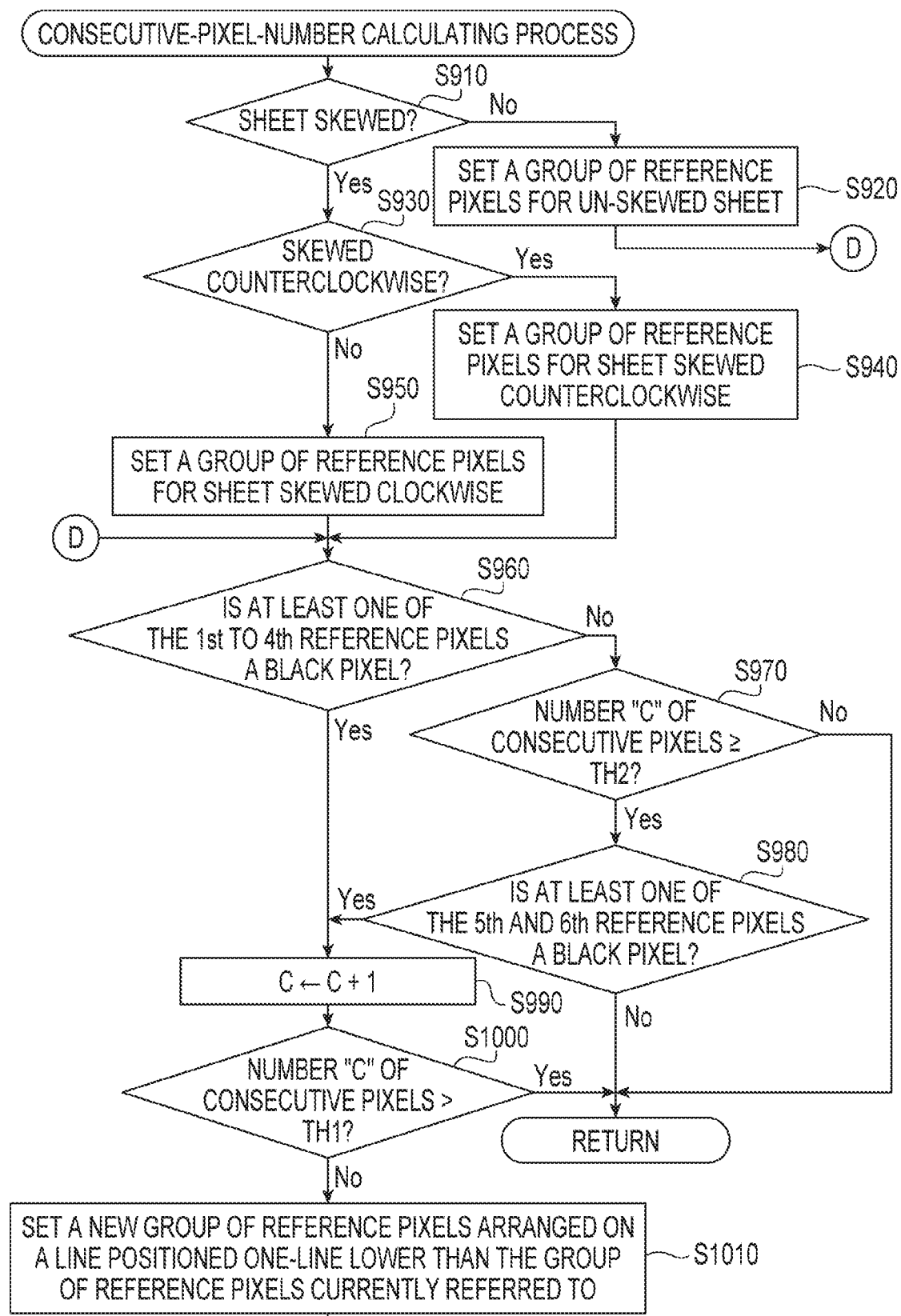
FIG. 11 is a flowchart showing a procedure of a consecutive-pixel-number calculating process to be performed by the document detector in the illustrative embodiment according to one or more aspects of the present disclosure.

An exemplary procedure of the consecutiveness determining process to be executed in S630 is substantially as shown in FIGS. 10A, 10B, and 11. Nonetheless, it is noted that the consecutiveness determining process to be executed in S630 is equivalent to such a process that the terms "left" and "right" are replaced with each other in the above descriptions about the flowcharts shown in FIGS. 10A, 10B, and 11 and the steps S550 and S790. In other words, the consecutiveness determining process to be executed in S630 is equivalent to such a process that the relationship between the "left" and the "right" in the main scanning direction is reversed in the consecutiveness determining process executed in S550.

By performing the consecutiveness determining process as above, in 5630, the document detector 57 detects, in the main scanning direction, a pixel corresponding to a left edge within the detection range in the main scanning direction, and refers to a plurality of pixels in the sub scanning direction on the basis of the detected pixel, thereby detecting a group of pixels consecutive in the sub scanning direction and corresponding to left edges. In response to detecting a group of pixels consecutive in the sub scanning direction and corresponding to left edges, the document detector 57 sets the document flag to "ON." Otherwise, the document detector 57 maintains the document flag to be "OFF."

When the document flag has been set to "ON" in the consecutiveness determining process executed in S630 (S640: Yes), the document detector 57 terminates the edge detecting process. Meanwhile, when the document flag has been maintained to be "OFF" in the consecutiveness determining process executed in S630 (S640: No), the document detector 57 performs the density determining process in S650. The density determining process to be executed in S650 is substantially as shown in FIG. 14. Nonetheless, it is noted that the density determining process to be executed in S650 is such a process that the terms "left" and "right" are replaced with "right" and "left," respectively, in the above descriptions about the flowchart shown in FIGS. 14 and S570. In other words, the consecutiveness determining process to be executed in s630 corresponds to such a process that the terms "left" and "right" are replaced with each other in the consecutiveness determining process to be executed in S550. Further, in the consecutiveness determining process to be executed in S630, the term "outer" referred to in FIG. 14 corresponds to "left" relative to the central area, and the term "inner" referred to in FIG. 14 corresponds to "right" relative to the central area.

By performing the density determining process as above, in S650, the document detector 57 detects a position of the left edge, based on a distribution of black pixels within the rectangular area corresponding to the detection range in the main scanning direction. In response to detecting a position of the left edge, the document detector 57 sets the document flag to "ON." Meanwhile, in response to failing to detect a position of the left edge, the document detector 57 maintains the document flag to be "OFF." Thereafter, the document detector 57 terminates the edge detecting process, and goes to 5430. In response to determining that the document flag is set to "ON" (S430: Yes), the document detector 57 goes to S440. Meanwhile, in response to determining that the document flag is maintained to be "OFF" (S430: No), the document detector 57 terminates the lateral-side detecting process.

As described above, the image scanner 1 of the illustrative embodiment detects pixels corresponding to the document edge within a limited range (the detection range) in the main scanning direction in the edge detecting process. Therefore, even when there exists, in the image data, a pixel that may cause erroneous detection such as detecting a scanned image of a tab or a clip attached to the sheet Q, the image scanner 1 may exclude such a pixel from the detection range and detect pixels corresponding to the left and right sides of the sheet Q.

Further, in the edge detecting process performed for the first time after the start of the scanning process, the image scanner 1 of the illustrative embodiment determines the detection range in the main scanning direction, based on the position of the non-reference corner QB acquired in the leading-end detecting process. For instance, when the sheet Q is not skewed, the image scanner 1 sets the position of the non-reference corner QB in the main scanning direction as the center of the detection range in the main scanning direction. Additionally, in the edge detecting process performed for the second or later time after the start of the scanning process, the image scanner 1 sets the detection range in the main scanning direction, based on the edge position detected in the previous edge detecting process. Therefore, the image scanner 1 of the illustrative embodiment may restrict the detection range for detecting a document edge and prevent a pixel really corresponding to the document edge from being excluded from the detection range.

Accordingly, even when there exists a scanned image of a tab or a clip attached to the sheet Q in the image data, the image scanner 1 of the illustrative embodiment may accurately detect a position of a document edge corresponding to a lateral side of the sheet Q and therefore appropriately perform subsequent processes such as a trimming process.

In particular, according to the illustrative embodiment, the image scanner 1 performs the edge detecting process for each predetermined number M of lines (e.g., each 32 lines) in the sub scanning direction. In each edge detecting process, the image scanner 1 detects, in the main scanning direction, a pixel corresponding to a document edge within the detection range in the main scanning direction and refers to a plurality of pixels in the sub scanning direction with respect to the detected pixel (i.e., the start pixel), thereby detecting a group of pixels consecutive in the sub scanning direction and corresponding to a lateral side of the sheet Q. Then, in response to detecting the group of pixels consecutive in the sub scanning direction, the image scanner 1 determines (detects) a position of the document edge. Accordingly, the image scanner 1 may efficiently detect the group of pixels consecutive in the sub scanning direction and corresponding to the document edge while preventing incorrect detection of the document edge due to influences of noises.

Furthermore, in the illustrative embodiment, the image scanner 1 performs the document detecting process (see FIG. 4) in consideration of a possibility that the sheet Q may be set with a skew. Specifically, when detecting a skew of the sheet Q in the leading-end detecting process (see FIG. 5), the image scanner 1 determines a group of reference pixels depending on the detected skew of the sheet Q. Accordingly, even when the sheet Q is skewed, the image scanner 1 may efficiently and appropriately detect a group of pixels consecutive in the sub scanning direction and corresponding to the document edge on the basis of the start pixel.

Moreover, in the illustrative embodiment, when failing to detect a group of pixels consecutive in the sub scanning direction and corresponding to the document edge, the image scanner 1 determines (detects) a position of the document edge based on a distribution of black pixels within the rectangular area corresponding to the detection range in the main scanning direction. Accordingly, even when failing to detect a group of pixels consecutive in the sub scanning direction and corresponding to the document edge, the image scanner 1 may accurately detect the position of the document edge.

Further, according to the illustrative embodiment, in the edge detecting process, when failing to detect a right edge position, the image scanner 1 attempts to detect a left edge position substantially in the same method as implemented for detecting a right edge position. Then, when becoming unable to detect any position of a right edge or a left edge as a document edge, the image scanner 1 terminates the lateral-side detecting process and provides the main controller 30 with the scanning-completed notification that image scanning from the leading end to the trailing end of the sheet Q in the sub scanning direction has been completed. In response to receiving the scanning-completed notification, the main controller 30 causes the line image sensor 10 to stop repeatedly performing line scanning and causes the moving mechanism 60 to stop moving the line image sensor 10.

Through the aforementioned control, the image scanner 1 may quickly terminate an unnecessary scanning operation after the line image sensor 10 completes image scanning of the trailing end of the sheet Q, and may go to subsequent processing steps such as a trimming process and outputting the image data. Thus, according to the illustrative embodiment, the image scanner 1 may be provided with very useful functions for detecting document edge positions.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the image scanner 1 may be configured not to perform S590 to S650 for detecting a left edge. The image scanner 1 may be configured not to perform the density determining process.

Further, one or more functions of a single element in the aforementioned illustrative embodiment may be dispersedly provided to and/or achieved by a plurality of elements. Functions of a plurality of elements in the aforementioned illustrative embodiment may be integrally provided to and/or achieved by a single element. One or some of the elements exemplified in the aforementioned illustrative embodiment may be omitted. At least a part of the elements exemplified in the aforementioned illustrative embodiment may be added to or replaced with other elements according to aspects of the present disclosure. It should be recognized that any aspects within the scope of the inventive concept as expressed herein may be illustrative embodiments or modifications according to the present disclosure.

Associations between elements exemplified in the aforementioned illustrative embodiment and elements according to aspects of the present disclosure will be exemplified below. The image scanner 1 may be an example of an "image scanner" according to aspects of the present disclosure. The document table 20 may be an example of a "document table" according to aspects of the present disclosure. The line image sensor 10 may be an example of an "image sensor" according to aspects of the present disclosure. The document detector 57 may be an example of a "document detector" according to aspects of the present disclosure. Further, the processor 57A and the memory 57B storing the programs 57C may be included in the "document detector" according to aspects of the present disclosure. The memory 57B may be an example of a "non-transitory computer-readable medium" according to aspects of the present disclosure. The moving mechanism 60 may be an example of a "mover" according to aspects of the present disclosure. Further, the motor 65 and the motor controller 70 may be included in the "mover" according to aspects of the present disclosure. The main controller 30 may be an example of a "controller" according to aspects of the present disclosure.

What is claimed is:

1. An image scanner comprising:
   a document table for supporting a rectangular sheet placed thereon, the document table having a specific position thereon where one of four corners of the sheet is placed as a reference corner;
   an image sensor for repeatedly performing line scanning to scan the sheet placed on the document table in a main scanning direction while moving in a sub scanning direction perpendicular to the main scanning direction, thereby generating image data representing a scanned image of the sheet; and
   a processor being configured to:
      detect a non-reference corner of the sheet placed on the document table, the non-reference corner being opposed to the reference corner across an upper side of the sheet in the main scanning direction, the upper side extending in the main scanning direction from the reference corner;
      each time the image sensor repeatedly performs the line scanning a predetermined number of times while moving in the sub scanning direction, perform an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times;
      in the edge detecting process performed for a first time, set a detection reference position based on the detected non-reference corner in the main scanning direction, the detection reference position being a center of a first detection range in the main scanning direction, the first detection range being for detecting the position of the lateral side of the sheet in the main scanning direction;
      in the edge detecting process performed for a second or later time, set the detection reference position based on a detected position of the lateral side detected from the edge detecting process performed in a previous time; and
      in each edge detecting process, set the first detection range in the main scanning direction on the basis of the set detection reference position, and detect a specific pixel corresponding to the lateral side in the main scanning direction within the first detection range.

2. The image scanner according to claim 1, wherein the processor is further configured to:
perform the edge detecting process each time the image sensor moves over a predetermined length in the sub scanning direction while repeatedly performing the line scanning the predetermined number of times; and
in each edge detecting process, detect the position of the lateral side of the sheet, by detecting a group of pixels consecutive in the sub scanning direction and corresponding to the lateral side within a second detection range in the sub scanning direction, the second detection range corresponding to the predetermined length in the sub scanning direction.

3. The image scanner according to claim 2,
wherein the processor is further configured to:
detect the group of pixels consecutive in the sub scanning direction and corresponding to the lateral side, by detecting the specific pixel corresponding to the lateral side in the main scanning direction within the first detection range in the main scanning direction, and referring to a plurality of pixels in the sub scanning direction on the basis of the detected specific pixel.

4. The image scanner according to claim 3,
wherein the processor is further configured to:
detect a skew of the sheet; and
determine the plurality of pixels to be referred to on the basis of the specific pixel, depending on the detected skew of the sheet.

5. The image scanner according to claim 2,
wherein the processor is further configured to:
when failing to detect the group of pixels consecutive in the sub scanning direction and corresponding to the lateral side, detect the position of the lateral side, based on a distribution of black pixels in a rectangular area defined by the first detection range in the main scanning direction and the second detection range in the sub scanning direction.

6. The image scanner according to claim 5,
wherein the rectangular area includes:
a central area having an outer end and an inner end in the main scanning direction, the outer end being positioned further outward of the sheet than the inner end in the main scanning direction;
an outer area positioned further outward of the sheet than the outer end of the central area in the main scanning direction; and
an inner area positioned further inward of the sheet than the inner end of the central area in the main scanning direction, and
wherein the processor is further configured to:
determine a first density of black pixels in the central area;
determine a second density of black pixels in the outer area;
determine a third density of black pixels in the inner area; and
detect the position of the lateral side based on the first density, the second density, and the third density.

7. The image scanner according to claim 6,
wherein the processor is further configured to:
when the second density is more than a particular threshold, detect, as the position of the lateral side, a position shifted outward of the sheet in the main scanning direction from the previous position of the lateral side detected in the previous edge detecting process; and
when the third density is more than a specific threshold, detect, as the position of the lateral side, a position shifted inward of the sheet in the main scanning direction from the previous position of the lateral side detected in the previous edge detecting process.

8. The image scanner according to claim 7,
wherein the processor is further configured to:
when the first density is equal to or less than a predetermined threshold, set a shift amount larger than when the first density is more than the predetermined threshold;
when the second density is more than the particular threshold, detect, as the position of the lateral side, a position shifted by the shift amount outward of the sheet in the main scanning direction from the previous position of the lateral side detected in the previous edge detecting process; and
when the third density is more than a specific threshold, detect, as the position of the lateral side, a position shifted by the shift amount inward of the sheet in the main scanning direction from the previous position of the lateral side detected in the previous edge detecting process.

9. The image scanner according to claim 1,
wherein the processor is further configured to:
in response to failing to detect the position of the lateral side extending in the sub scanning direction from the non-reference corner of the sheet, detect a position of another lateral side extending in the sub scanning direction from the reference corner, by detecting a pixel corresponding to the another lateral side of the sheet in the main scanning direction within the scanned image corresponding to the image data generated by the line scanning repeated the predetermined number of times.

10. The image scanner according to claim 1, further comprising:
a motor for moving the image sensor in the sub scanning direction; and
a controller configured to control the image sensor to repeatedly perform the line scanning while controlling the mover to move the image sensor in the sub scanning direction,
wherein the controller is further configured to, in response to the document detector becoming unable to detect the position of the lateral side, control the image scanner to stop repeatedly performing the line scanning.

11. The image scanner according to claim 1,
wherein the processor comprises:
a memory storing processor-executable instructions configured to, when executed by the processor, cause the processor to detect the non-reference corner and repeatedly perform the edge detecting process.

12. A method implementable on a processor coupled with an image scanner, the image scanner comprising:
a document table for supporting a rectangular sheet placed thereon, the document table having a specific position thereon where one of four corners of the sheet is placed as a reference corner; and
an image sensor for repeatedly performing line scanning to scan the sheet placed on the document table in a main scanning direction while moving in a sub scanning direction perpendicular to the main scanning direction, thereby generating image data representing a scanned image of the sheet, the method comprising:
detecting a non-reference corner of the sheet placed on the document table, the non-reference corner being opposed to the reference corner across an upper side of the sheet in the main scanning direction, the upper side extending in the main scanning direction from the reference corner;
each time the image sensor repeatedly performs the line scanning a predetermined number of times while moving in the sub scanning direction, performing an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times;
in the edge detecting process performed for a first time, setting a detection reference position based on the detected non-reference corner in the main scanning direction, the detection reference position being a center of a first detection range in the main scanning direction, the first detection range being for detecting the position of the lateral side of the sheet in the main scanning direction;
in the edge detecting process performed for a second or later time, setting a the detection reference position based on a detected position of the lateral side detected from the edge detecting process performed in a previous time; and
in each edge detecting process, setting the first detection range in the main scanning direction on the basis of the set detection reference position, and detecting a specific pixel corresponding to the lateral side in the main scanning direction within the first detection range.

13. A non-transitory computer-readable medium storing computer-readable instructions that are executable by a processor coupled with an image scanner, the image scanner comprising:
a document table for supporting a rectangular sheet placed thereon, the document table having a specific position thereon where one of four corners of the sheet is placed as a reference corner; and
an image sensor for repeatedly performing line scanning to scan the sheet placed on the document table in a main scanning direction while moving in a sub scanning direction perpendicular to the main scanning direction, thereby generating image data representing a scanned image of the sheet, the instructions being configured to, when executed by the processor, cause the processor to:
detect a non-reference corner of the sheet placed on the document table, the non-reference corner being opposed to the reference corner across an upper side of the sheet in the main scanning direction, the upper side extending in the main scanning direction from the reference corner;
each time the image sensor repeatedly performs the line scanning a predetermined number of times while moving in the sub scanning direction, perform an edge detecting process to detect a position of a lateral side extending in the sub scanning direction from the non-reference corner of the sheet, by detecting a pixel corresponding to the lateral side of the sheet in the main scanning direction within a scanned image corresponding to image data generated by the line scanning repeated the predetermined number of times;
in the edge detecting process performed for a first time, set a detection reference position based on the detected non-reference corner in the main scanning direction, the detection reference position being a center of a first detection range in the main scanning direction, the first detection range being for detecting the position of the lateral side of the sheet in the main scanning direction;
in the edge detecting process performed for a second or later time, set the detection reference position based on a detected position of the lateral side detected from the edge detecting process performed in a previous time; and
in each edge detecting process, set the first detection range in the main scanning direction on the basis of the set detection reference position, and detect a specific pixel corresponding to the lateral side in the main scanning direction within the first detection range.

* * * * *

UNITED STATES PATENT AND TRADEMARK OFFICE
CERTIFICATE OF CORRECTION

PATENT NO. : 10,574,846 B2
APPLICATION NO. : 16/161131
DATED : February 25, 2020
INVENTOR(S) : Isamu Fujii It is certified that error appears in the above-identified patent and that said Letters Patent is hereby corrected as shown below:

On the Title Page

Column 2, Line 7 delete and insert the following:
--U.S. PATENT DOCUMENTS
2005/0191100 A1*        09/2005        Ooshima...........H04N1/00681
                                                        399/370--

Signed and Sealed this
Ninth Day of June, 2020

Andrei Iancu
*Director of the United States Patent and Trademark Office*